United States Patent [19]

Briggs et al.

[11] Patent Number: 5,166,995
[45] Date of Patent: Nov. 24, 1992

[54] POLARIZED CONNECTOR

[75] Inventors: Robert C. Briggs, Newport; Lloyd R. Budd, Harrisburg; John C. Hoffer, Harrisburg; William J. Stape, Harrisburg; Donald W. Thompson, Mechanicsburg; Robert N. Weber, Hummelstown, all of Pa.

[73] Assignee: AMP Incorporated, Harrisburg, Pa.

[21] Appl. No.: 821,502

[22] Filed: Jan. 7, 1992

Related U.S. Application Data

[60] Continuation of Ser. No. 653,196, Feb. 8, 1991, abandoned, which is a division of Ser. No. 439,206, Nov. 17, 1989, Pat. No. 5,076,656, which is a continuation-in-part of Ser. No. 328,259, Mar. 23, 1989, abandoned, which is a continuation-in-part of Ser. No. 112,188, Oct. 26, 1987, abandoned.

[51] Int. Cl.$^5$ .............................................. G02B 6/38
[52] U.S. Cl. ...................................... 385/58; 385/59; 385/60
[58] Field of Search ........................... 350/96.2, 96.21; 385/58, 59, 60, 62, 139

[56] References Cited

U.S. PATENT DOCUMENTS 3,032,737  5/1962  Rottmann ............................ 439/446
3,271,725  9/1966  Bloch .................................. 439/141
3,474,395  10/1969  Ferdon et al. ....................... 439/633

(List continued on next page.)

FOREIGN PATENT DOCUMENTS 0078399   5/1983  European Pat. Off. .
0079160   5/1983  European Pat. Off. .
0106172   4/1984  European Pat. Off. .
0137665   4/1985  European Pat. Off. .
0154781   9/1985  European Pat. Off. .
59-229514 12/1984  Japan .
2069174    8/1981  United Kingdom .
2069175A   8/1981  United Kingdom .
2119120A  11/1983  United Kingdom .
2176065   12/1986  United Kingdom .

OTHER PUBLICATIONS

Noel et al.; "Safety Closure for Fiber-Optic Devices"; IBM Technical Disclosure Bulletin; vol. 22, No. 6 Nov. 1979; pp. 2393-2394.
"AMP Wall Outlet Cover Kits 501026-1 and 501424-1"; Dec. 1, 1987.
"AMP Wall Outlet Cover Kits 501309-[], 501428-[], X501734-[]"; Dec. 8, 1987.
Patent Abstract of Japan, vol. 4, No. 110 (P-22) [592], Aug. 8, 1980 and JP-A-5567712 (Nippon Denshin Denwa Kosha); May 22, 1980.
Patent Abstract vol. 8 #14 (P-249) (1451) Jan. 21, 1984.

*Primary Examiner*—John D. Lee
*Assistant Examiner*—John Ngo

[57] ABSTRACT

A duplex fiber optic connector assembly enables mating the fibers of a first multifiber cable with like fibers of a second cable or cables with maximum axial alignment of the respective fiber paris. An interconnect member receives cable terminating connectors in opposite sides thereof. Each connector carries the fibers of a respective cable in individual ferrules, each ferrule having limited floating mount within the respective connector. The mating pairs of ferrules are received in opposite ends of receptor members each of which has an axially profiled bore adapted to receive the respective ferrules and a profiled outer surface which allows movement about the geometric center of the receptor so as to axially align the bores of the ferrules received therein. Connectors at each end of a predetermined length of fiber optic cable provide a fiber optic extension cord, analogous to the well-known electrical extension cord, for convenient and efficient interconnection between optical signal-using equipments. Small interconnect members receive the connectors of such fiber optic extension cords to allow even wider-ranging interconnections. Wall boxes containing such interconnect members, connected to permanently installed fiber optic cables conveying optical signals from a central optical signal source, allow a user to readily access optical signals by "plugging-in" a connector therein.

14 Claims, 17 Drawing Sheets

U.S. PATENT DOCUMENTS

| | | | |
|---|---|---|---|
| 3,518,620 | 4/1968 | Bushey et al. | 439/629 |
| 3,550,615 | 12/1970 | Eriksen | 137/362 |
| 3,575,684 | 4/1971 | McIntyre | 439/140 |
| 3,638,013 | 1/1972 | Keller | 362/120 |
| 3,754,205 | 8/1973 | Lenkey | 439/141 |
| 3,897,134 | 7/1975 | Serivo et al. | 385/78 |
| 3,926,497 | 12/1975 | Eigenbrode | 339/91 R |
| 4,166,664 | 9/1979 | Herrmann, Jr. | 339/91 R |
| 4,167,303 | 9/1979 | Bowen et al. | 385/59 |
| 4,203,004 | 5/1980 | Cox | 174/135 |
| 4,233,724 | 11/1980 | Bowen et al. | 29/4218 |
| 4,277,135 | 7/1981 | Schrott et al. | 350/96.21 |
| 4,281,892 | 8/1981 | Sitabbhan | 350/96.21 |
| 4,303,304 | 12/1981 | Ruiz | 350/96.2 |
| 4,340,267 | 7/1982 | Nukaga | 439/141 |
| 4,376,565 | 3/1983 | Bird et al. | 439/681 |
| 4,440,469 | 4/1984 | Schumacher | 350/96.2 |
| 4,445,739 | 5/1984 | Westen | 439/141 |
| 4,448,467 | 5/1984 | Weidler | 439/80 |
| 4,449,767 | 5/1984 | Weidler | 439/64 |
| 4,449,784 | 5/1984 | Basov et al. | 350/96.21 |
| 4,557,542 | 12/1985 | Coller et al. | 439/595 |
| 4,580,868 | 4/1986 | Verstyner | 339/186 M |
| 4,611,887 | 9/1986 | Glover et al. | 350/96.21 |
| 4,645,295 | 2/1987 | Pronovost | 350/96.2 |
| 4,648,688 | 3/1987 | Ashman et al. | 350/96.2 |
| 4,653,828 | 3/1987 | Szczesny et al. | 339/91 R |
| 4,669,802 | 6/1987 | Schaffer | 439/122 R |
| 4,673,242 | 6/1987 | Logan et al. | 385/84 |
| 4,678,264 | 2/1987 | Bowen et al. | 385/89 |
| 4,687,291 | 8/1987 | Stape et al. | 385/59 |
| 4,715,675 | 12/1987 | Kevern et al. | 350/96.2 |
| 4,721,475 | 1/1988 | Burke, Jr. | 439/133 |
| 4,726,647 | 2/1988 | Kakii et al. | 350/96.21 |
| 4,759,599 | 7/1988 | Yamaguchi et al. | 350/96.21 |
| 4,761,141 | 8/1988 | Hawk et al. | 439/153 |
| 4,762,388 | 8/1988 | Tanaka et al. | 350/96.2 |
| 4,762,389 | 8/1988 | Kaihara | 350/96.21 |
| 4,767,179 | 8/1988 | Sampson et al. | 350/96.2 |
| 4,787,706 | 11/1988 | Cannon, Jr. et al. | 350/96.2 |
| 4,793,683 | 12/1988 | Cannon, Jr. et al. | 350/96.21 |
| 4,798,440 | 1/1989 | Hoffer et al. | 350/96.2 |
| 4,805,980 | 2/1989 | Maskenroth | 350/96.21 |
| 4,986,625 | 1/1991 | Yamada et al. | 350/96.2 |

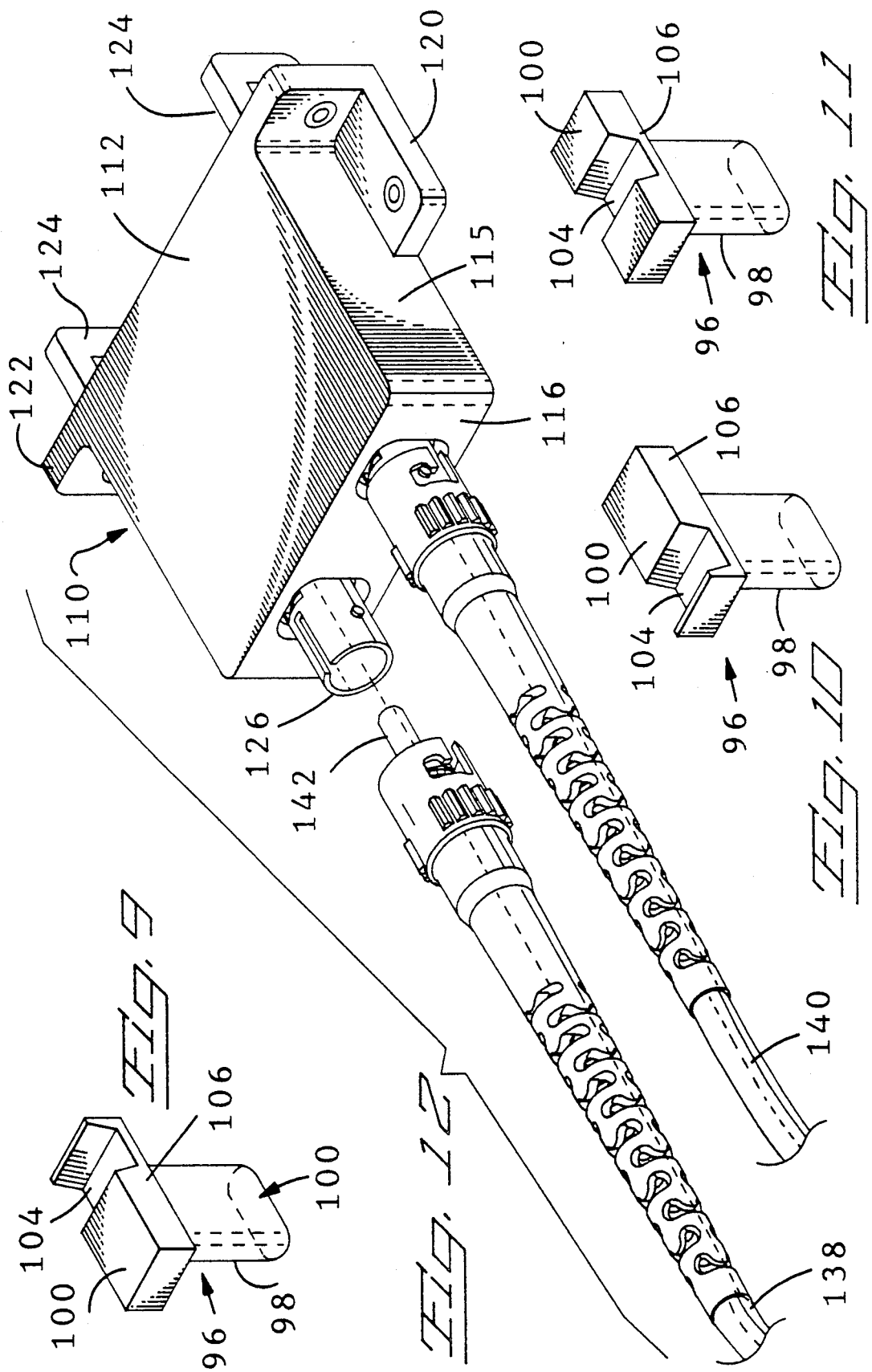

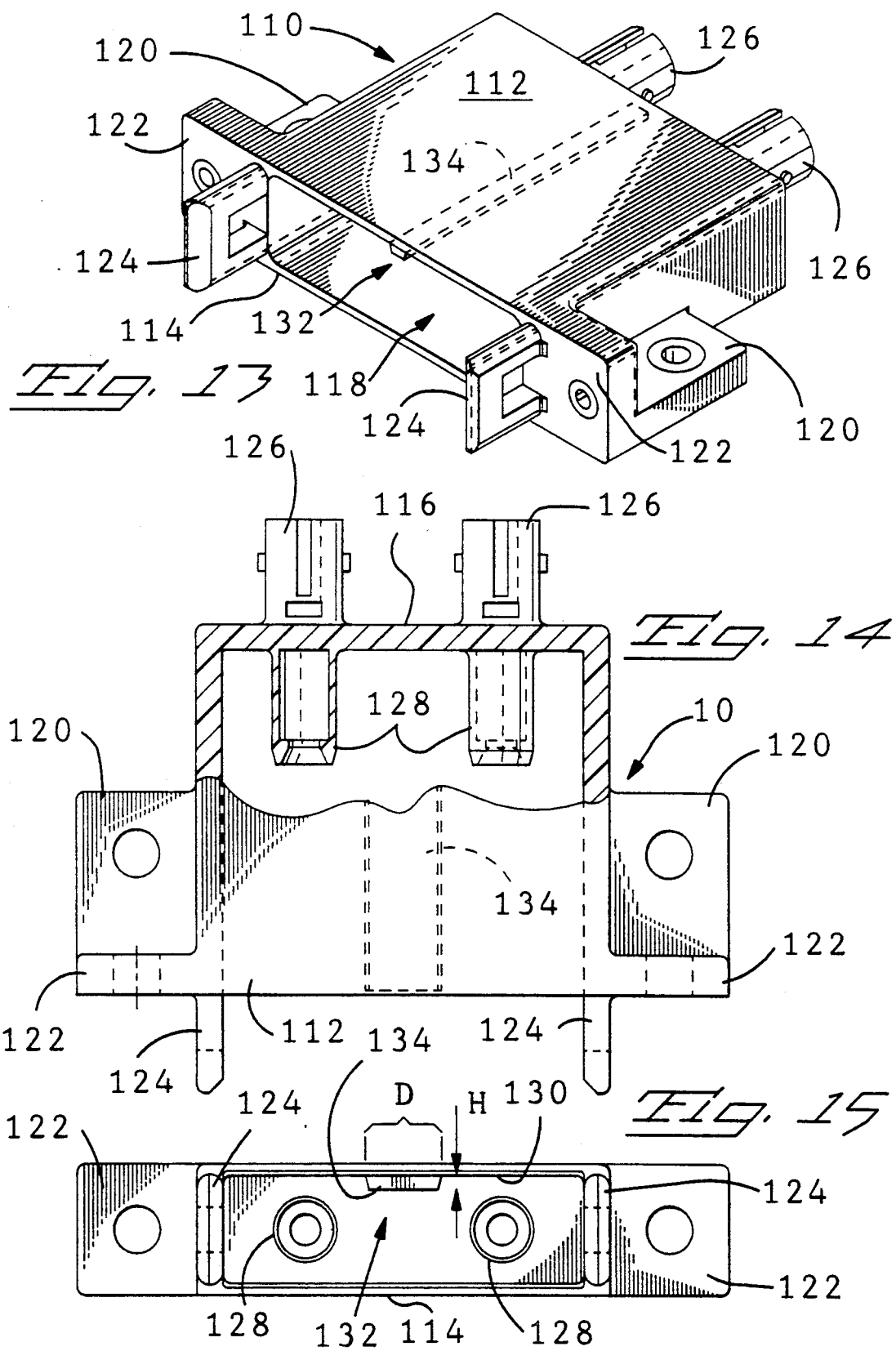

POLARIZED CONNECTOR

This application is a continuation of Ser. No. 653,196, filed Feb. 8, 1991, abandoned, in turn, a division of Ser. No. 439,206, filed Nov. 17, 1989, now U.S. Pat. No. 5,076,656, in turn, a continuation in part of Ser. No. 328,259, filed Mar. 23, 1989, abandoned, in turn a continuation in part of Ser. No. 112,188, filed Oct. 26, 1987, abandoned.

FIELD OF THE INVENTION

The present invention relates to polarized connectors having multiple keying combinations, and particularly to duplex connectors for optical fibers.

BACKGROUND OF THE INVENTION

It is well known in the connector art to provide keying systems for connector assemblies. Keying systems enable, for example, particular plugs to be keyed with a specific keying configuration so that they may only be connected to receptacles having a complementary keying configuration. This is done typically for the purpose of preventing connection of a plug to a receptacle which does not have a keying combination complementary to that of the plug. A wide variety of keying systems for this and similar purposes are known in the connector art.

There are, however, certain drawbacks typically associated with known connector keying systems. Many such systems require permanent and irreversible alteration, that one or more of the connectors to be keyed to each other be permanently altered in some fashion. For example, keying of the connectors disclosed in U.S. Pat. Nos. 4,448,467 and 4,449,767 requires that removable keying tabs be fractured from the plug type connector. Keying of the assembly disclosed in U.S. Pat. No. 4 376,565 requires that one or more slots be cut through the receptacle connector of the assembly. While U.S. Pat. No. 4,376,565 discloses that a slot could then be filled by an insert, the alterations to the respective connector assemblies are otherwise irreversible.

The keying system disclosed in U.S. Pat. No. 4,376,565, in requiring slots to be cut in the receptacle portion of the assembly, suffers from the additional disadvantage that the receptacle may be weakened by the slots. As a result, the fit between the plug and receptacle portions and the stability of the connection may suffer.

The keying systems of the aforesaid patents, like many other keying systems known in the art, require an error prone procedure to build the keying system on the connector and to assure that the configuration of several different keying locations on the plug portion be correlated correctly with a corresponding number of positions on the receptacle portion of the assembly. For example, in the assembly disclosed in U.S. Pat. No. 4,448,467, any of several keying tabs may be removed by fracturing from the plug portion and key plugs must be inserted in the corresponding positions on the receptacle portion. A similar operation is required with the system disclosed in U.S. Pat. No. 4,449,767. Likewise, in the keying system disclosed in U.S. Pat. No. 4,376,565, keys may be inserted in grooves on the surface of the plug at any of several positions and corresponding slots must be cut in the receptacle. These plural operations, with the attendant checking and cross-checking the multiple keying positions, make the keying procedure a time consuming task.

In each of the keying systems described above, removable keying elements are assembled into either the plug or the receptacle in a direction corresponding to the direction in which the plug and receptacle are moved relative to each other during connection. The keying elements are removed by movement in the direction in which the plug and receptacle are moved during disconnection. This is typical of many keying systems known in the art and presents at least some danger that the inserted keying element(s) may be dislodged or removed as a result of being pushed or pulled upon during connection and/or disconnection of the plug and receptacle. Should this occur, the keying configuration of the assembly will be undesirably altered. The keying elements may not be fully visible to the user, such as in the system disclosed in U.S. Pat. No. 4,449,767, this presents a danger that the altered state of the keying configuration may go undetected. The fact that keying elements may be wholly or partially obscured from view presents an additional problem in that an operator may have difficulty discerning the particular keying configuration or keying combination of a plug and/or receptacle.

Thus, as noted above with reference to the aforesaid exemplary keying systems, there are various drawbacks typically associated with keying systems or connectors known in the art.

The above discussion makes reference to connectors which are specifically adapted for electrical conductors. Recent years have seen the increasing use of optic fibers for conducting signals in communications systems, computer systems, etc. Optic fibers are by no means identical to electrical conductors, and connections of optic fibers involve considerations not present in connection of electrical conductors.

Some systems employing optical fibers to conduct signals impose additional requirements upon the connections for the fibers beyond simple matching of the correct plug to the correct receptacle. One such requirement is correct polarization of the connected fibers when two or more optical fibers are used in signal-conducting cables. Keying is required in computer mainframes and other peripheral equipment in local area networks (LAN) that are envisioned from the start to be implemented exclusively with fiber optics. That is, the components or stations in each LAN are to be connected with one another exclusively by optic fiber cables.

Connection of the stations in such a manner requires that each station comprises one or more physical connections, each connection including an input path and an output path, to and from the station. Because the output of one station must be correctly connected to the inputs of the other stations, it is absolutely necessary that correct polarization of all physical connections be maintained at all times.

Additionally, in any particular LAN, it is necessary that stations be connected in proper sequence and/or proper arrangement. In order to avoid errors in sequence or arrangement, and to avoid improper connections between respective stations, connectors employed in the system must also include a keying system.

A keying system may require four or more keying combinations. Four of these are designated as configurations A, B, Master (M) and Slave (S). A requirement would be that a plug having the Slave keying configuration must mate to a socket or receptacle having any of the various keying configurations. The A, B and Master configurations in the plug must mate only to the corresponding configuration in the receptacle. This must all be accomplished with a connector assembly which properly aligns respective optical elements and/or optical fiber pairs.

U.K. Patent Application GB 2,069,175 discloses a connector assembly suitable for connecting duplex optic fiber cables to each other. The assembly includes a receptacle sleeve adapted to receive a plug in either end thereof. Each end of the sleeve includes a recess, and each plug includes a protrusion which fits into the recess. The respective plugs cannot be fully inserted into the sleeve unless the protrusion associated with each plug is properly aligned with the recess in the sleeve. Consequently, proper polarization of the connected cables is obtained.

However, the connector assembly disclosed in the aforesaid U.S. patent application comprises no means whatsoever for altering the keying configuration of the plug and/or sleeve.

SUMMARY OF THE INVENTION

An object of the present invention is to provide a connector assembly for optical fibers which satisfies the above-discussed local area network requirements in all respects. The invention provides a connector assembly which satisfies such requirements in an advantageous manner and which provides additional advantageous features and benefits.

The present invention overcomes many disadvantageous features of previously-known connectors. The present invention provides a connector assembly which is quickly and easily keyed by a keying configuration and in which a keying configuration may be easily and repeatedly altered.

The present invention comprises a keying system wherein the keying configuration may be altered without special or complex tools and without permanent alteration of any component of the connector assembly. The present invention provides a keying system which may be manipulated easily by unskilled operators.

A further advantageous feature of the present invention is that the keying configuration of the inventive connector assembly is readily visible to a user. Thus, mating of a plug to a receptacle is easily achieved and incorrect mating is easily avoided.

According to the present invention, a universal plug is easily keyed to assume any of several keying configurations compatible with different receptacles.

Further, according to the invention, keying of a plug to a receptacle is accomplished by insertion of a keying element into the plug in a direction which is not in the direction in which the plug is inserted into a receptacle. Consequently, inadvertent pullout of the keying element during connection and/or disconnection of the plug and receptacle is avoided.

The present invention comprises keying structures for a plug and receptacle which are rigid and strong and which resist deformation to provide a tactile feel to an operator that noncomplementary keyed connectors are resisting the operator's attempt to connect connectors having noncomplementary keying structures.

The structure of a plug and receptacle according to the invention, and the manner in which a keying element is associated with the plug, permits virtually no deformation of the connector assembly components, thus preventing forced connection together of a mismatched plug and receptacle, i.e., a plug and receptacle having noncomplementary keying configurations.

According to the invention, a keying element is associated with a plug near the front end of the plug that is inserted into a receptacle. Consequently, upon attempted insertion of a plug to a mismatched receptacle, the keying element provides tactile feedback to an operator indicating a mismatched plug and receptacle, at the end of the plug, well before the plug is inserted within in the receptacle.

Consistent with expected uses in local area networks as well as with other potential uses of connectors according to the invention, the invention comprises connectors which facilitate both plug-to-receptacle connections and plug-to-plug connections through a receptacle.

Connectors having the keying system according to the present invention assures proper polarization of connected duplex optic fiber cables regardless of the selected keying configuration. Moreover, the connector assembly of the invention achieves four different keying configurations within a single contiguous keying area using only a single selected keying element.

A duplex plug in accordance with the invention is insertable into a receptacle by a simple linear movement regardless of the particular keying combination applied to the complementary keyed plug and receptacle.

A plug in accordance with the invention advantageously includes a shroud for protecting exposed ends of optical fibers associated with the plug. The shroud has a configuration that permits it to be mated with a similar plug held in mated relationship thereto by a duplex-to-duplex receptacle type connector according to the invention. Likewise, a plug type connector according to the invention may be used to connect optical fibers with a pair of stationary optical elements mounted within a receptacle.

The present invention comprises a keyed connector assembly including a receptacle having an opening and a plug having an exterior shape which is substantially complementary to the shape of the plug opening and the plug is axially insertable into the opening of the receptacle. In a preferred embodiment, the receptacle opening and the exterior profile cross-section shape of the plug are rectangular. The receptacle includes a receptacle keying portion including a portion of an interior surface of the receptacle having a first width and an inwardly projecting rib having a selected width within the range of the first width to provide a keying combination for defining a receptacle mating configuration. The plug includes a plug polarizing portion as an axially-extending channel of a width substantially complementary to the first width in an exterior surface of the plug at a position corresponding to the receptacle keying portion when the plug inserted into the receptacle. The plug includes a removable keying element arranged in a keying combination for selectively defining a plug mating configuration.

Invention further resides, in a connector comprising in combination a receptacle and an axially-insertable plug, the receptacle and plug including polarized portions which engage each other upon relative axial movement of the plug with respect to the receptacle, and a selectively attachable keying element associated with the plug. The keying element includes a profiled portion for defining the keying configuration of the plug and a retaining portion inserted into the plug in a direction substantially transverse to the axial direction of insertion of the plug into the receptacle.

BRIEF DESCRIPTION OF THE DRAWINGS

FIGS. 9-11 illustrate various keying elements which may be associated with a plug according to the present invention.

FIG. 12 is a rear perspective view of a first embodiment of a receptacle according to the invention partially assembled with a plurality of optic fiber conductors.

FIG. 13 is a front perspective view of the receptacle of FIG. 12.

FIG. 14 is a top view, partly in section, of the receptacle of FIGS. 12-13.

FIG. 15 is a front elevation view of the receptacle shown in FIGS. 12-14, depicting a first receptacle keying configuration.

DETAILED DESCRIPTION OF PREFERRED EMBODIMENTS

Figure 1:
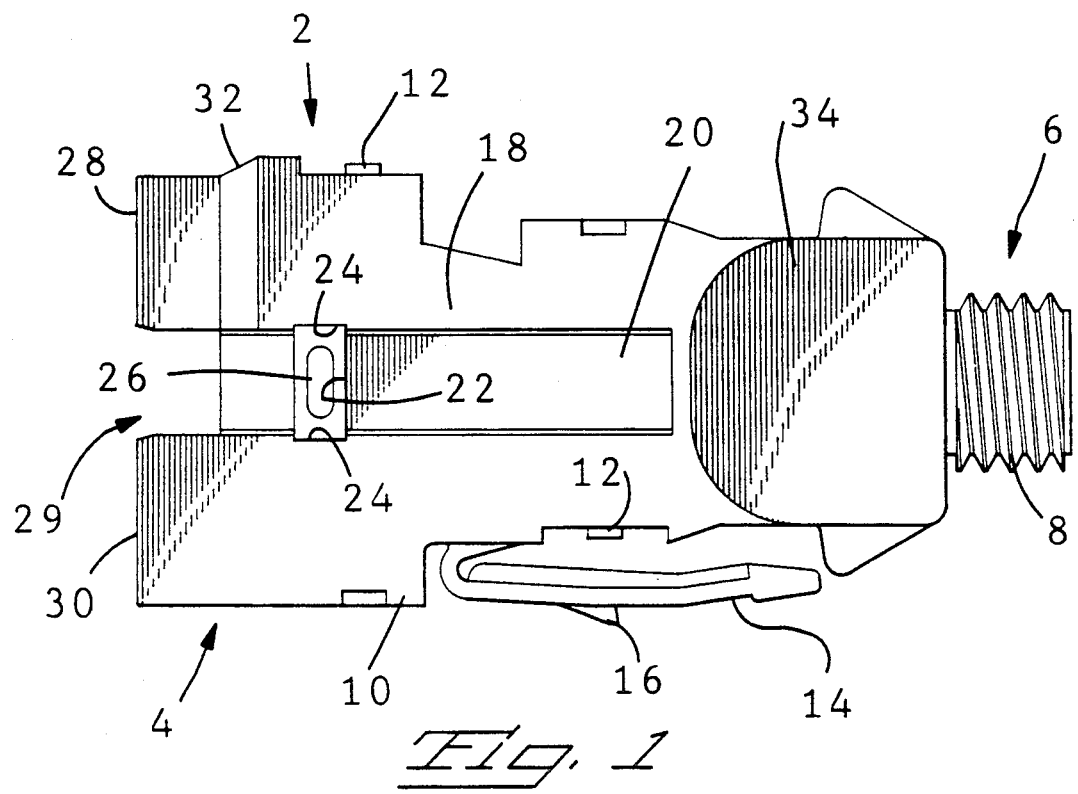
FIG. 1 is an exterior view of a first plug portion according to the invention.
Figure 2:
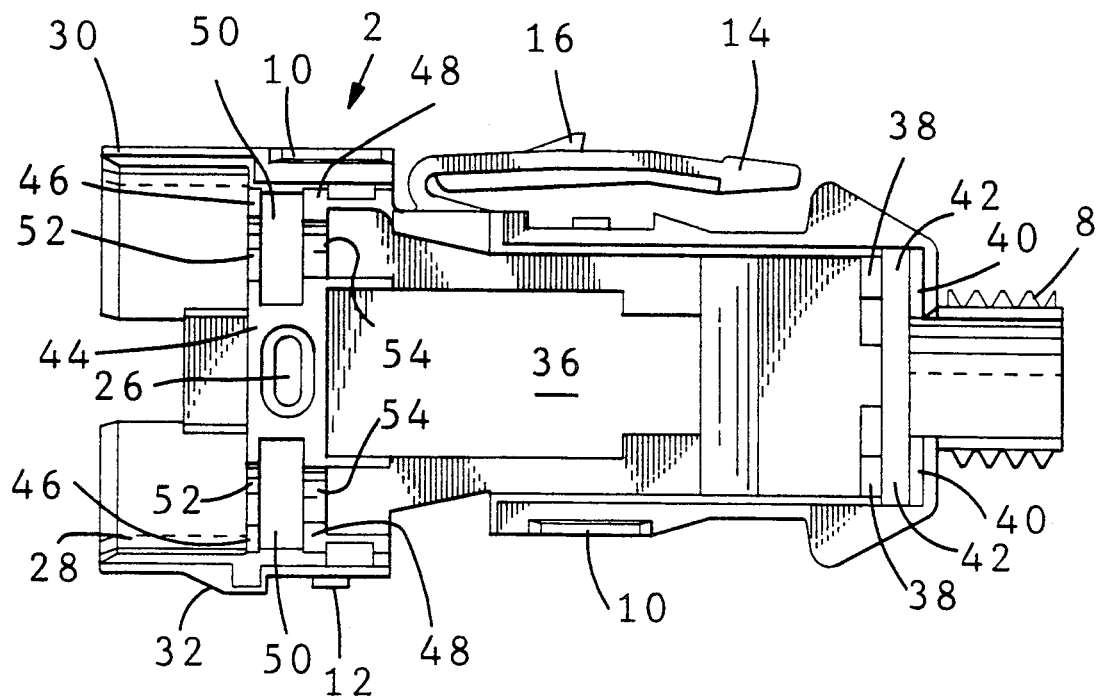
FIG. 2 is an interior view of the plug portion shown in FIG. 1.

FIGS. 1 and 2 are exterior and interior views, respectively, of one half of a plug connector according to the invention, designated generally by reference numeral 2. For the purpose of discussion, portion 2 will be designated the first body portion or "top" portion of the plug. Typically, portion 2 may be molded from, for example, thermoplastic material. Top portion 2 includes a front end 4 for insertion into a receptacle and a rear portion 6 including an externally-threaded cable entry 8. Top 2 includes a pair of plug assembly latches 10 and a pair of plug assembly lugs 12. Top 2 further includes a sole or single latching arm 14 which includes a latching lug 16 thereon.

A top exterior surface 18 has an axially extending channel 20 recessed therein. Channel 20 extends axially from the forward end 4 rearwardly along the plug. Within channel 20, near the front of the plug, is a detent 22. Detent 22 extends across channel 20 and laterally beyond on each side thereof into top exterior surface 18, thus forming a pair of lateral notches 24. An aperture 26 is formed in the bottom of detent 22, as seen in FIG. 1, and extends through to the interior of portion 2, as seen in FIG. 2.

Offset one side of front end 4 there is formed one half of a male shroud element 28. One half of a female shroud element 30 is formed offset at the opposite side of the front end. As shown in FIGS. 1 and 2, plug connector portion 2 includes a sloped or beveled portion 32 which tapers inwardly of the body portion and from which shroud element 28 extends. A space or gap 29 is formed between shroud elements 28 and 30 at the forward end of the plug in front of channel 20.

A gripping surface 34 may also be provided. Gripping surface 34 may flare outwardly toward the rear 6 of the plug.

As shown in FIG. 2, top portion 2 includes an interior cavity 36 forward of cable entry 8. Just forward of cable entry 8 are interior flanges 38 forming, with the rear wall 40 of top portion 2, a pair of slots 42 on opposite sides of the entry 8.

At the forward end of the top portion 2, surrounding a key element receiving passage or aperture portion 26, there is an integrally-molded web or bulkhead 44 which extends the full depth of top portion 2. Bulkhead 44 forms a rigid mass about aperture portion 26. Extending laterally from bulkhead 44 are forward ribs or ridges 46 and rearward ribs or ridges 48. Ridges 46 and 48 are also integrally-molded with top portion 2 and extend for the full depth of interior cavity 36. Together with bulkhead 44, ridges 46 and 48 strengthen and make rigid the front end 4 of top plug portion 2, and particularly the part thereof surrounding aperture portion 26. The exterior surface of the top portion 2, surrounding the web and ridges is rectangular in exterior profile.

Between ridges 46 and 48 are a pair of cavities 50. Recesses or grooves 52 and 54 are formed in ridges 46 and 48, respectively, communicating with cavities 50 between the corresponding ridges. Recesses 54 are semi-circular and recesses 52 are rectangular in shape.

Figure 3:
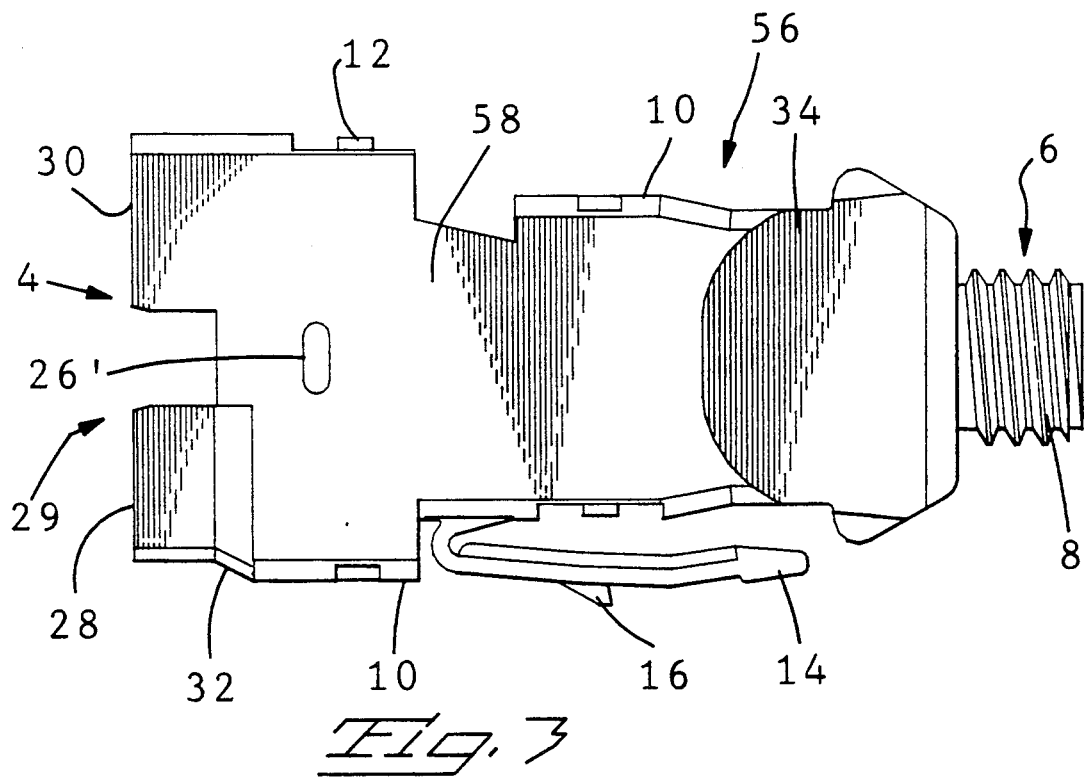
FIG. 3 is an exterior view of a second plug portion according to the invention.
Figure 4:
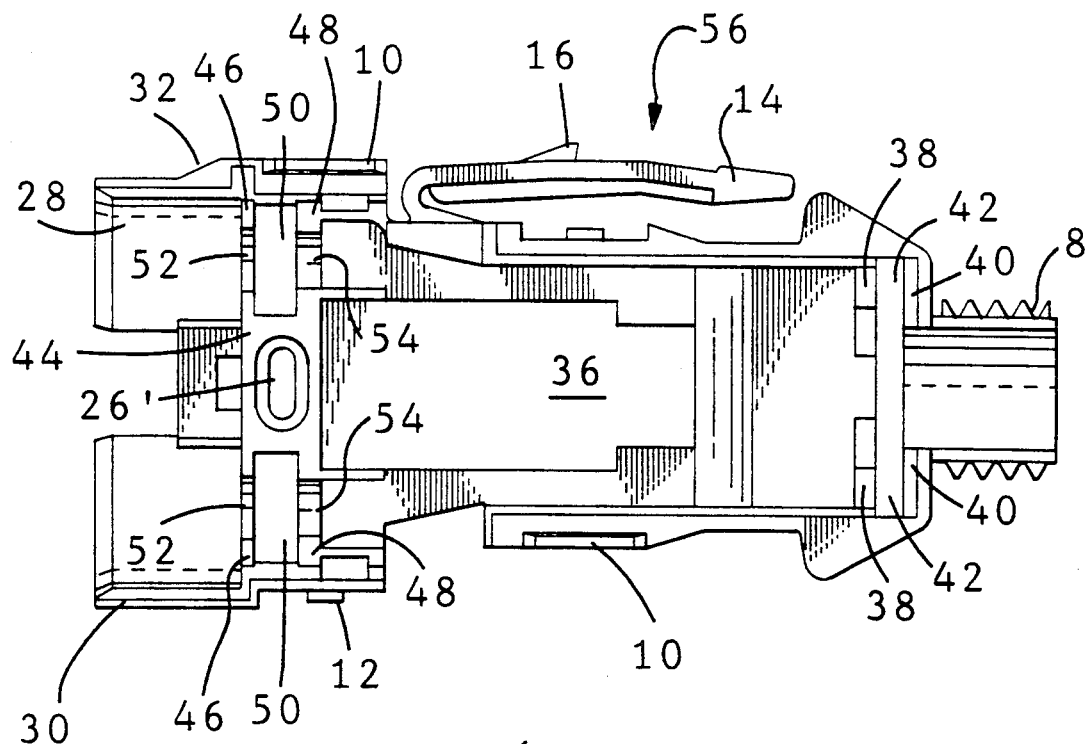
FIG. 4 is an interior view of the plug portion shown in FIG. 3.

FIGS. 3 and 4 illustrate exterior and interior views of a second body portion of a plug according to the invention, designated generally by reference numeral 56. For the purpose of discussion, portion 56, which is complementary to portion 2, will be designated the "bottom" portion of the plug. Bottom portion 56 may likewise be molded of thermoplastic material.

The configuration of bottom portion 56 is in many respects similar to top portion 2, with corresponding parts being designated by corresponding reference numerals. A major difference exists, however, between top portion 2 and bottom portion 56 in that bottom portion 56 comprises an exterior bottom surface 58 which is substantially flat, comprising no channel therein. Bottom portion 56 comprises an aperture portion or key element receiving passage 26' corresponding in position to aperture portion 26 in top portion 2.

According to a preferred embodiment of the invention, aperture portion 26 in top portion 2 is tapered. Specifically, the cross section of aperture portion 26 is largest at the exterior surface of top portion 2, at the base of keying element receiving recess or detent 22 (FIG. 1). The cross section becomes smaller as the aperture portion progresses through top portion 2 to the interior thereof, as shown in FIG. 2. Aperture portion 26' is likewise tapered and is of diminishing cross section as aperture portion 26' progress through bottom portion 56 to the exterior surface 58 thereof, as shown in FIG. 3.

Figure 5:
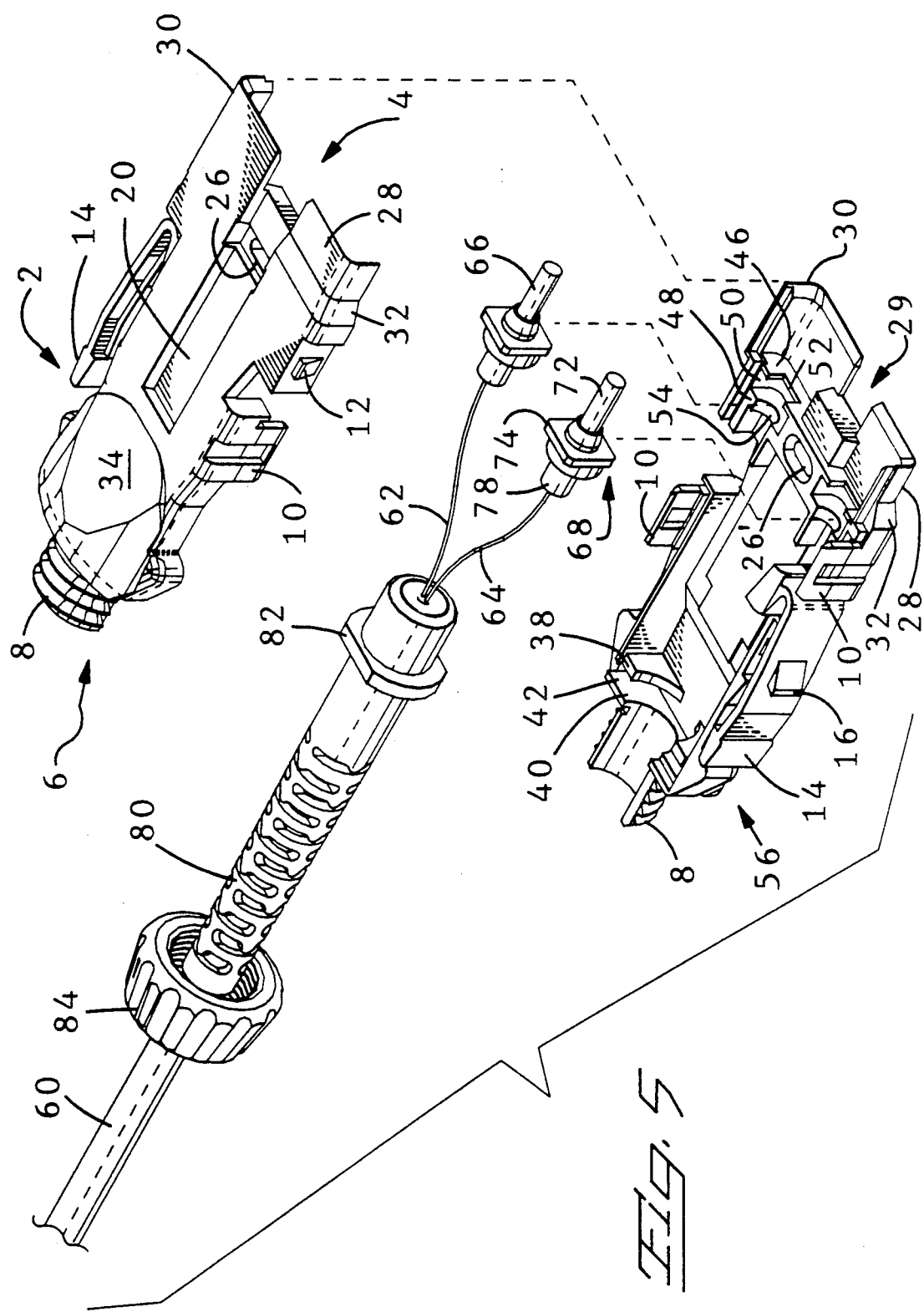
FIG. 5 is an exploded view of a plug assembly according to the present invention.

The manner in which top and bottom portions 2 and 56 of a plug according to the invention are assembled will be described with reference to FIG. 5 of the drawings. As shown in FIG. 5, a plug according to the present invention is adapted to be joined with a cable 60 having therewithin a pair of optic fibers 62 and 64. Optical fibers 62 and 64 are terminated by ferrules 66 and 68, respectively. Ferrules 66 and 68 may be formed of thermoplastics, ceramics, or other suitable materials. The invention is not limited to use with ferrules of the configuration illustrated in FIG. 5, but may be used with ferrules of other suitable configurations.

In the embodiment shown in FIG. 5, each ferrule has a nose 72. An annular flange 74 is formed to surround a corresponding ferrule and an O-ring 78 is positioned against the flange. Cable 60 is provided with a strain relief 80 having an integral annular flange 82. An internally threaded nut 84 is also provided.

When assembling the components illustrated in FIG. 5, ferrules 66 and 68 are seated in respective grooves 52 and 54 associated with ridges 46 and 48 so that flange 74 and O-rings 78 associated with the respective ferrules are seated in respective cavities 50 of bottom portion 56. This relationship of elements may also be seen in FIG. 21. Strain relief 80 is assembled with bottom portion 56 with flange 82 positioned within slots 42. Optic fibers 62, 64 extend through cavity 36 between cable 60 and ferrules 66, 68.

Top plug portion 2 is brought into engagement with bottom 56. When top 2 and bottom 56 ar assembled to engage each other ferrules 66 and 68 are seated within slots 50 and grooves 52, 54 of top portion 2 in the manner described with respect to bottom portion 56. Flange 82 of strain relief 80, likewise, is positioned within slots 42 of top portion 2.

Plug assembly latches 10 of top portion 2 engage and latch against plug assembly lugs 12 of bottom portion 56. Likewise, the latches 10 of bottom portion 56 engage and latch against lugs 12 of the top portion, thus securing the top and bottom portions together. Nut 84 is then threaded onto threaded cable entry portions 8, 8, completing assembly of the plug.

Bulkheads 44, 44, forward ridges 46, 46, and rearward ridges 48, 48 of the top and bottom portions, respectively, engage each other when the top and bottom portions are brought together. This forms a substantially surrounding mass of material through the entire depth and width of the plug and completely about aperture portions 26, 26'. This stiffens front end 4 of the plug, resisting deformation and making rigid a rectangular exterior portion of the plug surrounding the apertures.

When the top and bottom portions 2 and 56 are assembled, as discussed above, aperture portions 26 and 26' are brought into end-to-end relationship, thus forming a continuous keying element receiving passage or aperture through the plug. The size of the cross section of aperture portion 26' at the interior of bottom portion 56, as seen in FIG. 4, is the same size as the cross section of aperture portion 26 at the interior portion of top portion 2. As a result of the tapered configurations of aperture portions 26 and 26', described above, the combined keying element receiving passage or aperture extending through the plug tapers continuously from a first cross sectional dimension at the base of detent 22 in the top portion to a relatively smaller cross sectional dimension at the bottom surface 58.

Figure 6:
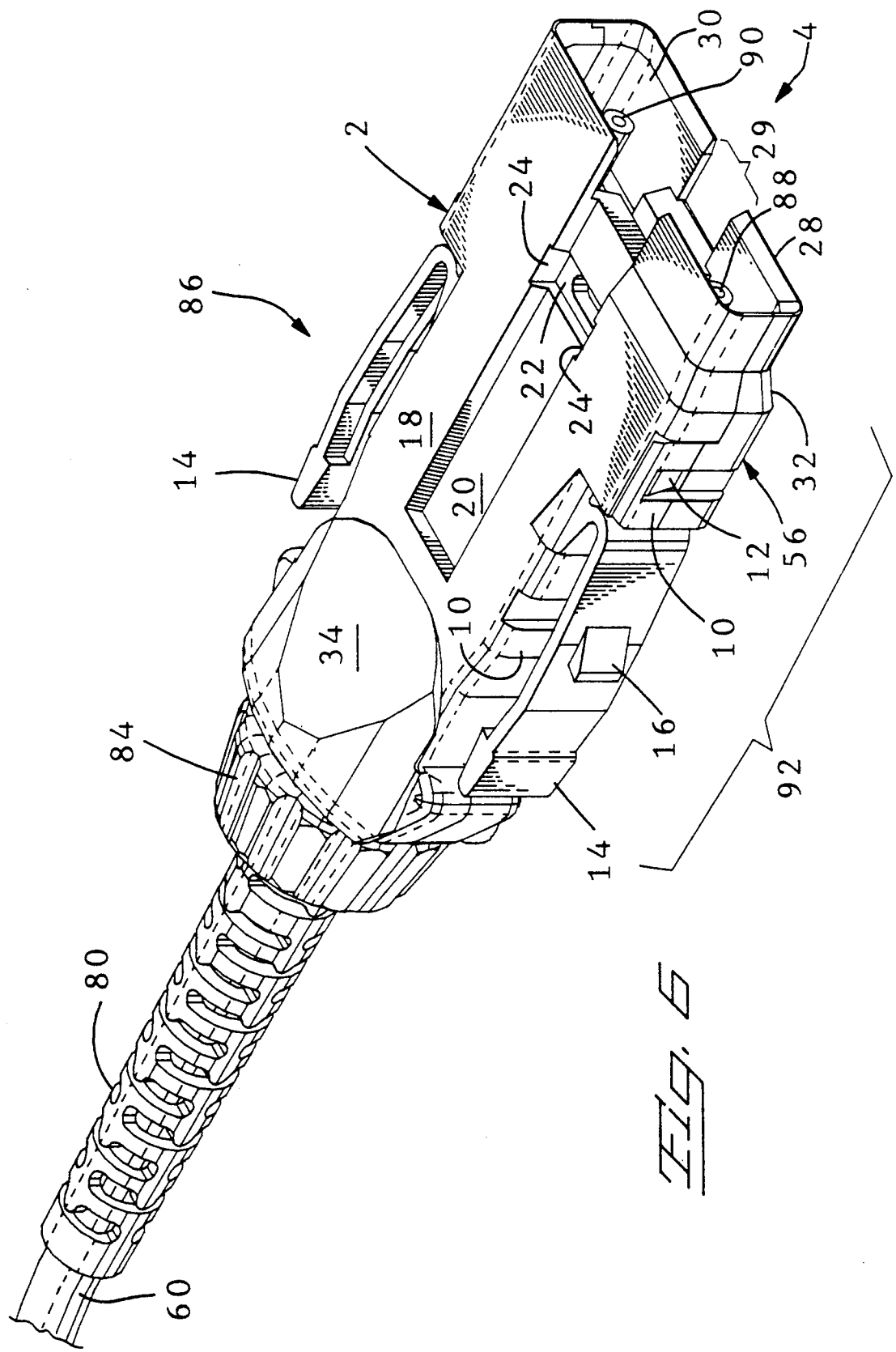
FIG. 6 is a perspective view of an assembled plug according to the present invention.

FIG. 6 is a perspective view of an assembled plug according to the invention, designated generally by reference numeral 86. Plug 86 includes a top portion 2 and a bottom portion 56 as described above. As shown in FIG. 6, the latching arms 14 associated with the top and bottom portions, respectively, form a pair of latching arms disposed on opposite sides of the assembled plug 86. Extending from front end 4 is a complete male shroud portion 28 formed by the top and bottom male shroud elements discussed above. Likewise, extending from front end 4 is a female shroud portion formed by the top and bottom shroud elements. Between each corresponding pair of the male and female shroud portions are corresponding spaces or gaps 29. (See also FIG. 7.) A pair of terminated ends 88 and 90 of optic fibers extend from end 4 of the plug within the area protected by the shroud comprising portions 28 and 30. Ends 88 and 90 correspond to the nose portions 72 of ferrules 66, 68. When viewed from front end 4, the forward part 92 of plug 86 is substantially rectangular in shape.

Figure 7:
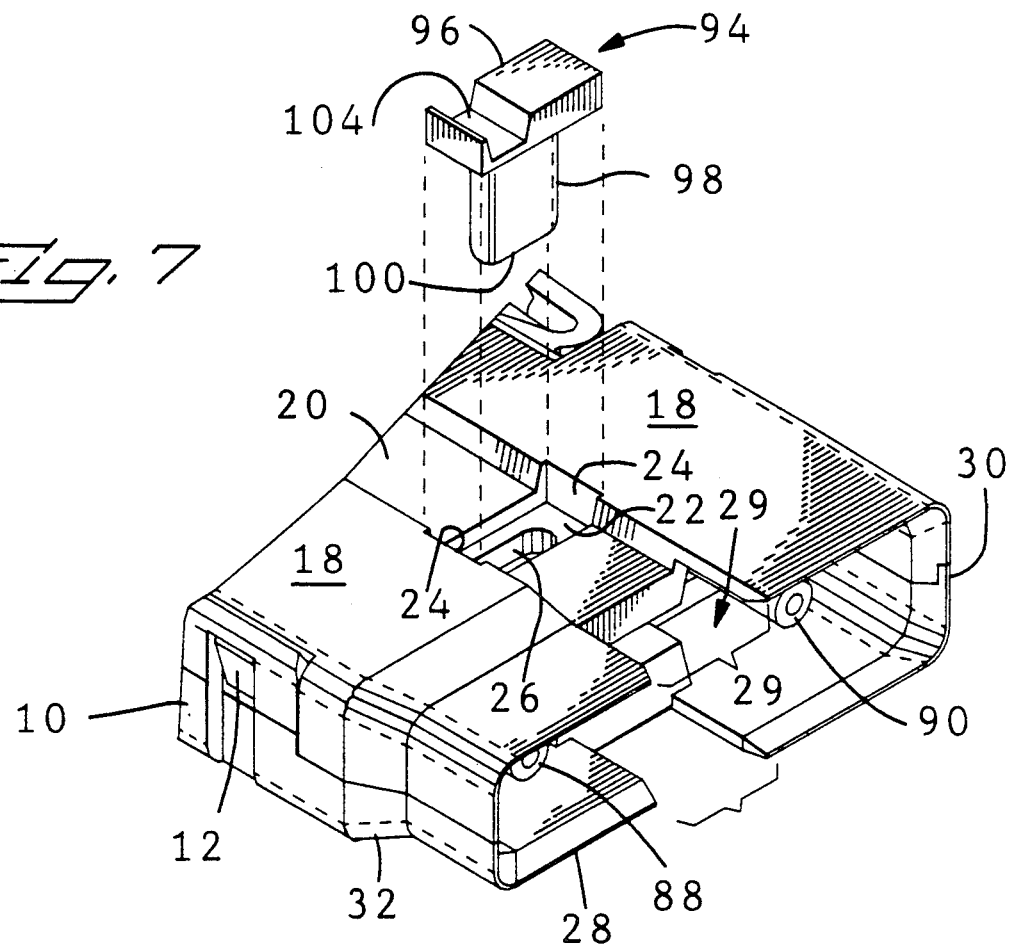
FIG. 7 is an exploded fragmentary perspective view of a plug and keying element according to the present invention.
Figure 8:
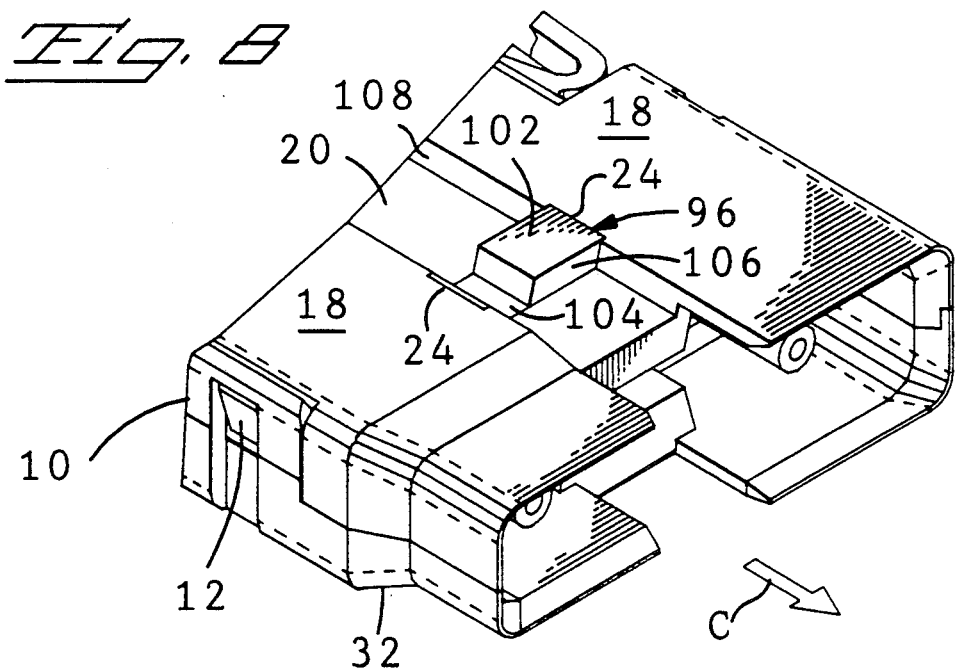
FIG. 8 is a fragmentary view, similar to FIG. 7, of the plug shown in FIG. 7 assembled with the keying element.

FIGS. 7-8 are detailed partial perspective views of the front end 4 of assembled plug 86, showing the manner in which a keying element 94 is associated therewith. Keying element 94, as illustrated in FIG. 7, may be of one piece and/or molded or cut from thermoplastic or metallic material, and includes a profiled portion 96 and a retaining portion 98. Retaining portion 98 comprises an elongated, tapered post having a cross section complementary to that of combined aperture portions 26, 26' and sized and constructed for a friction fit when insertable into the aperture portions. Post 98 is preferably tapered to conform to the aperture portions.

Profiled portion 96 is of block form, for example, The profiled portion may have any form that will conform in shape and size to be seated in detent 22. Specifically, the width of profiled portion 96 is larger than the width of the channel 20 and extends across channel 20 and into lateral notches 24 of detent 22, extending across the width of channel 20, as shown in FIG. 8. The detent notches 24 are received in the exterior of the rectangular portion of the plug 86.

When keying element 94 is inserted into plug 86, tapered elongated post 98 is received within the tapered aperture comprising aperture portions 26 and 26'. Post 98, and thus keying element 94, is retained in association with plug 86 by frictional forces between aperture portions 26, 26' and post 98. In the illustrated preferred embodiment, the cross section of post 98 and aperture portions 26, 26' are generally oval in configuration. The invention is not limited to this configuration. However, it is preferable that the cross section of the apertures and post is elongated or non-circular about the axis of the post whereby the aperture will prevent turning movement of keying element 94 about the axis and with respect to plug 86. The rigid structure comprised of bulkheads 44, 44 surrounding the aperture is sufficiently strong to resist such movement. Moreover, notches 24, which receive the ends of profiled portion 96, also resist turning and other types of displacement of keying element 94 with respect to plug 86. The result is a combination wherein the keying element is supported along its entire dimension through the plug and is virtually immovable with respect to the plug as a result of forces which may be imposed during insertion or attempted insertion of the plug into a receptacle in the direction of arrow C as shown in FIG. 8.

An additional advantage of the present invention is that keying element 94 is insertable into plug 86 in a direction which is substantially transverse or perpendicular to the direction in which the plug is moved to connect with a receptacle, designated by arrow C. As a result, the forces normally applied to and encountered by the keying element during connection and/or disconnection of the plug, which are generally are in the same direction or opposite to the direction designated by arrow C of FIG. 8, will not tend to remove or loosen keying element 94 from plug 86.

The keying configuration of the plug is constructed to be altered. The invention includes, therefore, novel means for disconnecting or facilitating removal of keying element 94 from plug 86. For example, the length of retaining post 98 is selected to extend to the distance through apertures 26, 26' from the base of detent 22 in the exterior surface of the top plug portion to the exterior surface 58 of the bottom plug portion. As a result, when post 98 is inserted into apertures 26, 26', and the profiled portion of keying element is firmly seated in detent 22 of plug 86, the bottom surface 100 of post 98 will be flush with bottom exterior surface 58 (FIG. 3) of bottom plug portion 56, and will be exposed through opening 26' at the bottom surface 58. It is then a simple matter to exert pressure on surface 100, pushing post 98 upwardly with respect to plug 86, overcoming the frictional engagement of post 98 with the interior surface of apertures 26, 26'. This may be easily accomplished with a small screwdriver, pin, paperclip or virtually any other simple implement, engaging the end of the post of the keying element 94 and urging upwardly post axially of the aperture of plug 86, whereby the profiled portion is projected out of the detent 22 may be grasped and removed completely.

The above-discussed removal procedure for keying element 94 may be quickly and easily accomplished using a simple implement readily available to a service person or an operator of a system employing a connector assembly according to the present invention. While the removal procedure may be easily accomplished, it must be deliberately performed inasmuch as, as discussed above, it is highly unlikely that the keying element will be removed accidentally from the plug.

As illustrated in FIG. 8, when keying element 94 is inserted fully into plug 86, the top surface 102 of profiled portion 96 is flush with top surface 18 of the plug. Profiled portion 96 comprises a keying element receiving keyway or recess 104, the bottom of which is flush with the bottom of channel 20. Channel 20 remains open for axial passage, i.e., ingress and egress, of a key along and through recess 104. The remainder of channel 20 is blocked to axial ingress and egress by a front face 106 of profiled portion 96.

FIGS. 9-11 illustrate various plug keying elements which may be associated with a plug in accordance with the present invention. These configurations are designated A, B and M (master), respectively. Retaining posts 98 of the respective keying elements are identical to fit within apertures 26, 26'. The overall length, width, and height of each profiled portion 96 are identical to the other profile portions 96, to fit within detent 22, span across channel 20 and extend into lateral notches 24, as previously described. The location of recess 104 in each profiled portion is different.

FIG. 10 illustrates the B configuration, a "B" designation being placed upon surface 106 which faces the forward end 4 of the plug when the keying element is inserted in the plug. For example, the keying element associated with the plug of FIGS. 7-8 is of the B configuration.

FIG. 9 illustrates a plug keying element having the configuration designated "A". In this configuration, recess 104 is offset to the side of profiled portion 96 opposite to the recess of the B configuration. If the keying element of FIG. 9 is inserted in a plug in the manner illustrated in FIGS. 7-8, recess 104 would be adjacent the side wall 108 of recess 20 (FIG. 8). Thus, axial ingress and egress of a receptacle keying element would be permitted with respect to a portion of channel 20 along the keyway or recess 104 adjacent sidewall 108, while the remainder of channel 20 would be blocked by surface 106 to the receipt of a receptacle keying element along the channel 20.

Comparison reveals that the configurations of the profiled portions of the keying elements of FIGS. 9 and 10 on opposite sides of the same keying element, with the same recess 104 having either an A or B configuration. As a result, the keying configurations A and B may be achieved using an identical keying element but inserted in aperture portions 26, 26' facing in opposite directions. To this end, the cross sectional configuration of aperture portions 26, 26, is symmetrical about the axes thereof to accommodate insertion of the keying element facing in opposite directions.

FIG. illustrates a third embodiment of a keying element according to the present invention, designated as "M" or Master. This configuration comprises a recess 104 at the center of the forward end of the profiled portion 96, i.e., not offset from the center. Thus, axial ingress and egress of a receptacle keying element with respect to channel 20 would be permitted along the center portion of the channel and along and through the recess at the center of the forward end of the profiled portion 96 while the side portions of the channel would be blocked by surface 106, in the manner previously described. Due to the central disposition of recess 104 in the M key configuration, the keying element may be reversed in its mounting within plug 86 without altering the keyed configuration of the plug.

A first embodiment of a receptacle according to the invention for mating with plug 86 will be described with reference to FIGS. 12-18.

FIG. 12 is a rear perspective view of a receptacle, generally designated by reference numeral 110. Receptacle 110 includes a top wall 112, a bottom wall 114, sides 115 and a rear wall 116. A front opening 118, shown in the front perspective view of FIG. 13, is rectangular in shape, corresponding to the rectangular shape of the forward portion 92 of plug 86. Receptacle 110 includes a first pair of mounting ears 120 and a second pair of mounting ears 122 for mounting the receptacle on, for example, a printed circuit board or instrument panel. A pair of latching ears 124 are provided adjacent opposite sides of front opening 118.

A pair of connectors 26 are formed at the exterior of rear wall 116. In the embodiment illustrated, connectors 126 are bayonet-type connectors. However, the invention is not limited to this type, and may also comprise connectors of any other known configuration. From the interior of rear wall 116 there extend a pair of cylindrical extensions 128 which are internal to receptacle 110. One of the cylindrical extensions 128 is shown in section in FIG. 14.

Centrally disposed on the top interior surface 130 of receptacle 110 is a receptacle keying area or portion designated by reference numeral 132. Keying portion 132 has a first width D, as shown in FIG. 15. Within keying portion 132 is located a receptacle keying element or rib or key 134 which extends to the front opening 118 of the receptacle (FIG. 13). Rib 134 may extend all the way to rear wall 116, as shown in dashed lines in FIG. 13, or may extend only partially into receptacle 110. It important that rib 134 have sufficient depth from front opening 118 rearwardly to be strong enough to resist breakage and deformation as a result of forces imposed on the rib in the direction of insertion of a plug into the receptacle. Receptacle 110 should be substantially rigid and may be molded of thermoplastic material. Rib 134 is preferably integrally molded with receptacle 110. The height, H, of rib 134 (FIG. 15) projects into the channel 20 when the plug 86 is inserted in the receptacle. The height of rib 134 corresponds to the depth of channel 20 in plug 86 so that rib 134 will nest slidably within channel 20 when the plug is inserted into the receptacle 110.

In the embodiment illustrated in FIGS. 14-15, rib 134 has a width that is larger than that of any keyway or recess 104 of any keying element 96. The rib 134 has a width corresponding to the full width D of keying portion 132. This corresponds to the width of channel 20 whereby rib 134 will be nest slidably within the full width of channel 20 when plug 86 is inserted into receptacle 110.

Figure 16:
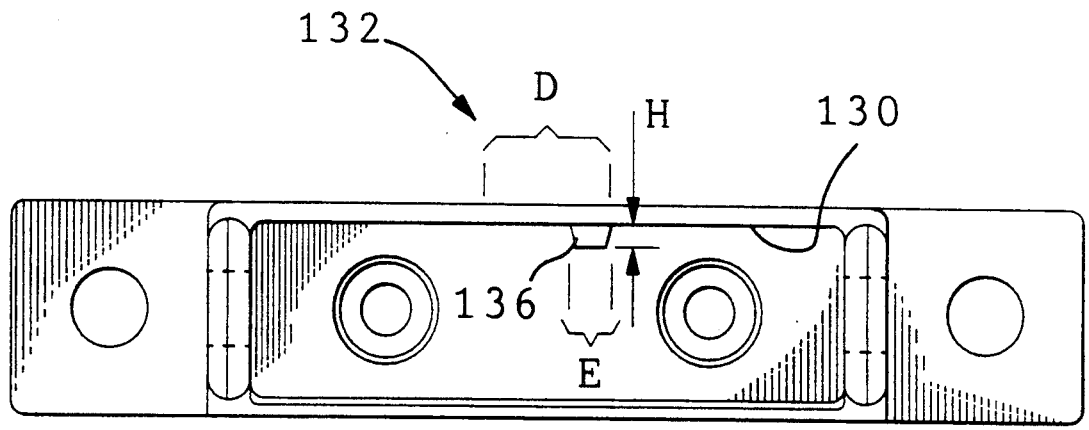
FIGS. 16-18 are front elevation views of a receptacle as shown in FIGS. 12-14, showing alternate keying configurations.
Figure 17:
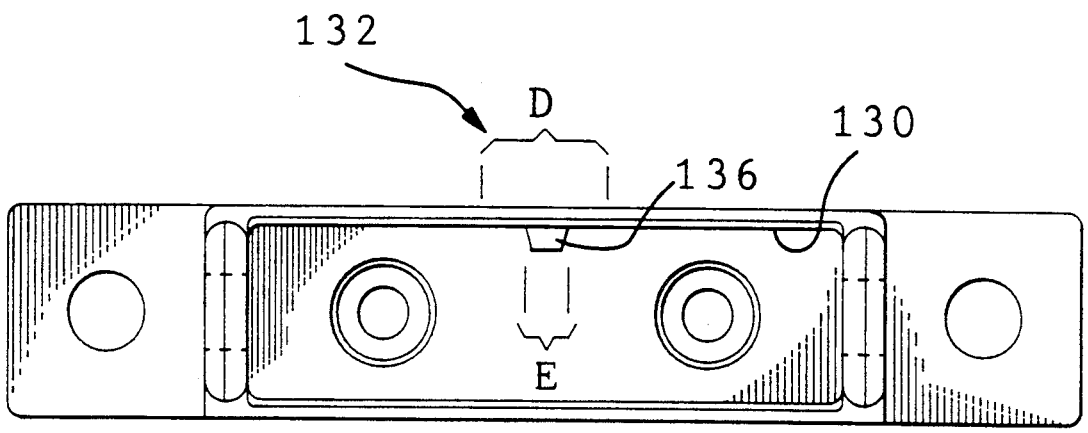
Figure 18:
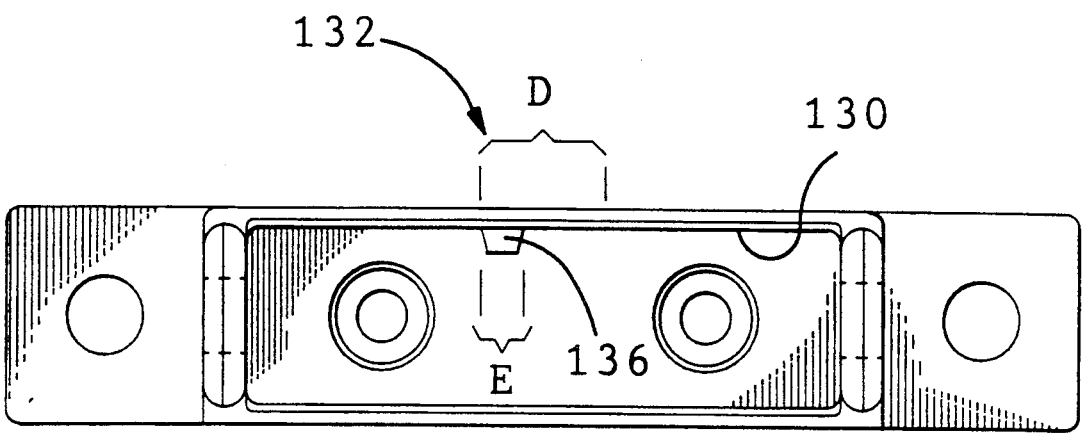

FIGS. 16-18 illustrate alternate embodiments of a receptacle 110 according to the invention. The embodiments of FIGS. 16-18 comprise a rib 136 having a width E, which is less than width D of keying portion 132. The height H of each of the ribs 136 is like that of the rib 134, i.e., projects into the channel. The height of each of the ribs 136 corresponds to the depth of channel 20 in plug 86 to slidably fit along the depth of the channel. As shown in FIGS. 16, 17 and 18, the position of the rib 136 varies from one receptacle to another. A receptacle 110 will always be provided with one of the receptacle keying elements or ribs 134 or 136 for projecting into a channel of a plug 86, to provide proper polarization of a plug 86 in a receptacle 110. Thus, two optical fibers carried by the plug are polarized with respect to the receptacle.

In the embodiment illustrated in FIG. 16, rib 136 is positioned within, i.e., aligned with keying portion 132 so that it aligns with and nests slidably in recess 104 in the plug keying element 94 having the B configuration, when such a keying element is associated with a plug inserted into receptacle 110. As shown in FIG. 17, wherein rib 136 is centrally disposed within keying portion 132, the receptacle is compatible with a plug which has associated therewith a plug keying element of the M configuration. In the receptacle illustrated in FIG. 18, rib 136 is positioned within keying portion 132 in such a manner that it will align with and be received and nest slidably in recess 104 in a plug keying element of the A configuration associated with a plug inserted into receptacle 110. Width E of the relatively narrower rib 136 corresponds to, i.e., is complementary in size to be received in the width of each of the recesses 14 in the corresponding profiled portions of keying elements 94.

Figure 21:
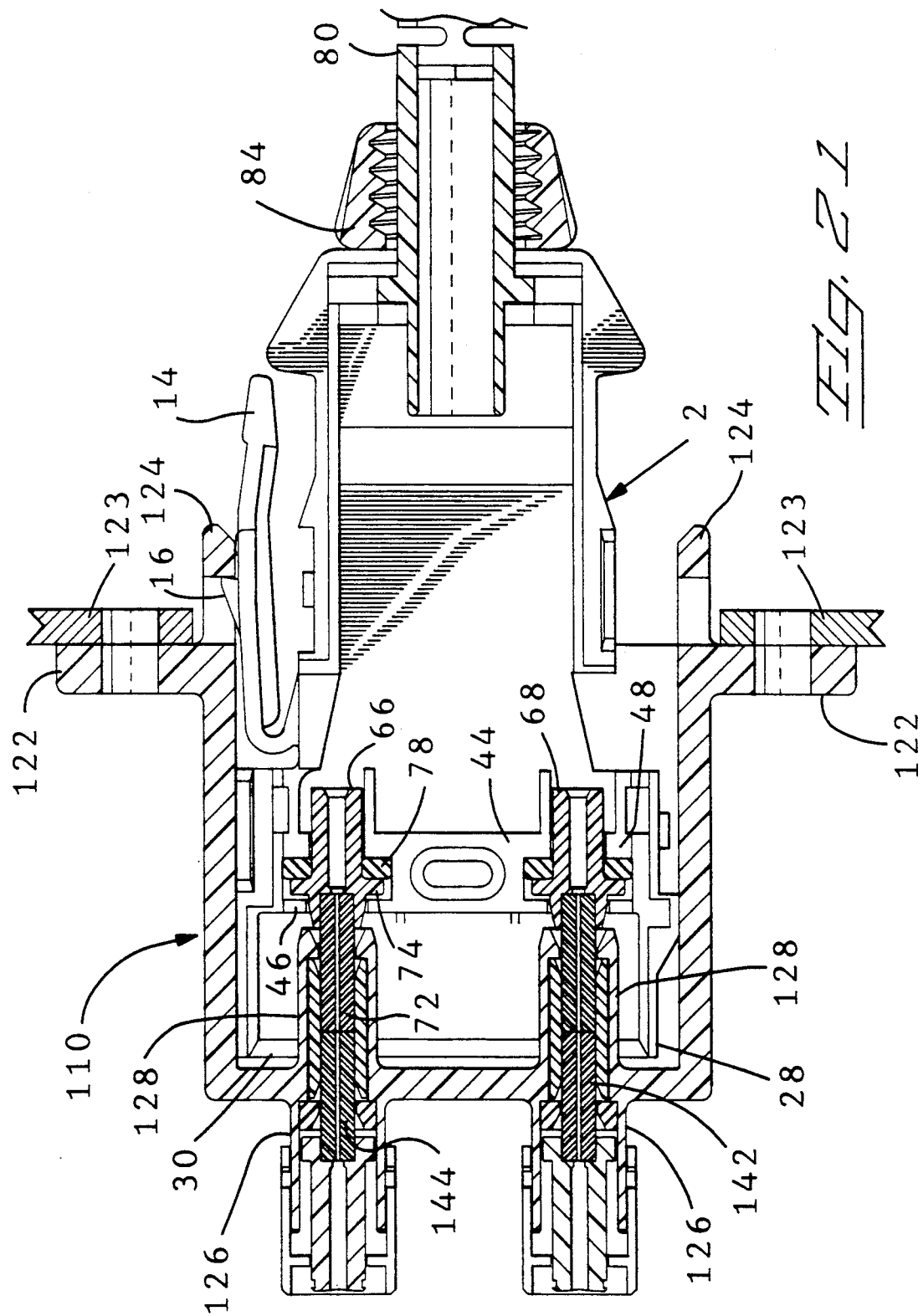
FIG. 21 is a sectional view of the mated plug and receptacle illustrated in FIG. 20.

As shown in FIGS. 12 and 21, optic fiber cables 138 and 140 are joined with bayonet connectors 126 of receptacle 110. The terminated optic fibers 142 and 144 extending from cables 138 and 140, respectively, extend through cylindrical interior projections 128 when cables 138 and 140 are joined to connectors 126, as shown in cross section in FIG. 21.

Figure 19:
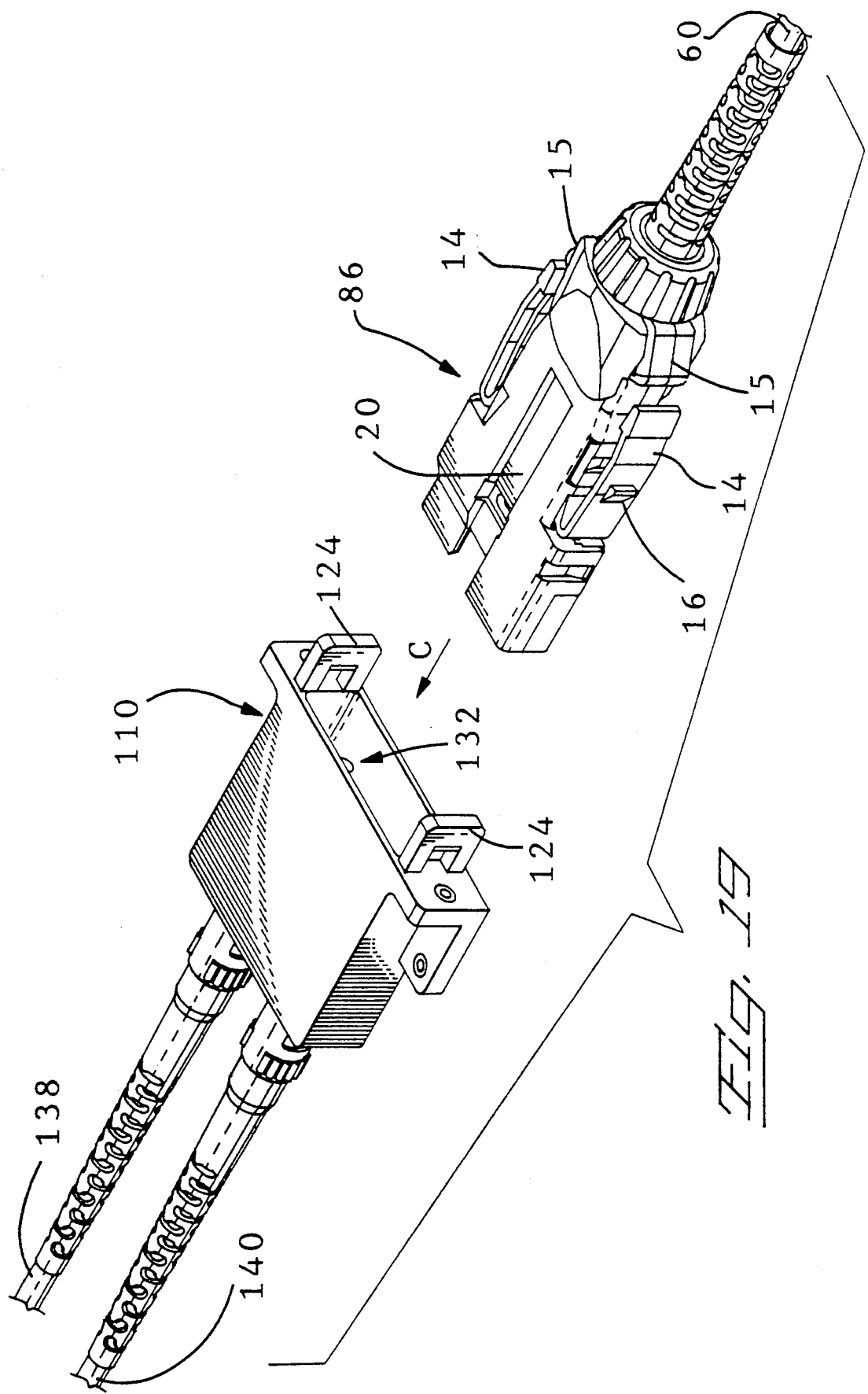
FIGS. 19-20 depict the manner in which a plug according to the invention is mated with a receptacle as shown in FIGS. 12-18.

As illustrated in FIG. 19, a plug 86 may be inserted by simple axial movement along the direction of arrow C into receptacle 110. Channel 20 of plug 86 is aligned with keying portion 132 of receptacle 110. Plug 86 can be inserted into receptacle 110 only when channel 20 is aligned with keying portion 132 in this manner. Should one attempt to insert plug 86 upside down into receptacle 110, any rib associated with keying portion 132 will contact front end 4 of plug 86 adjacent bottom surface 58 thereof, preventing insertion int o the receptacle. Consequently, plug 86 can be inserted in only one orientation, whereby proper polarization is assured.

Figure 20:
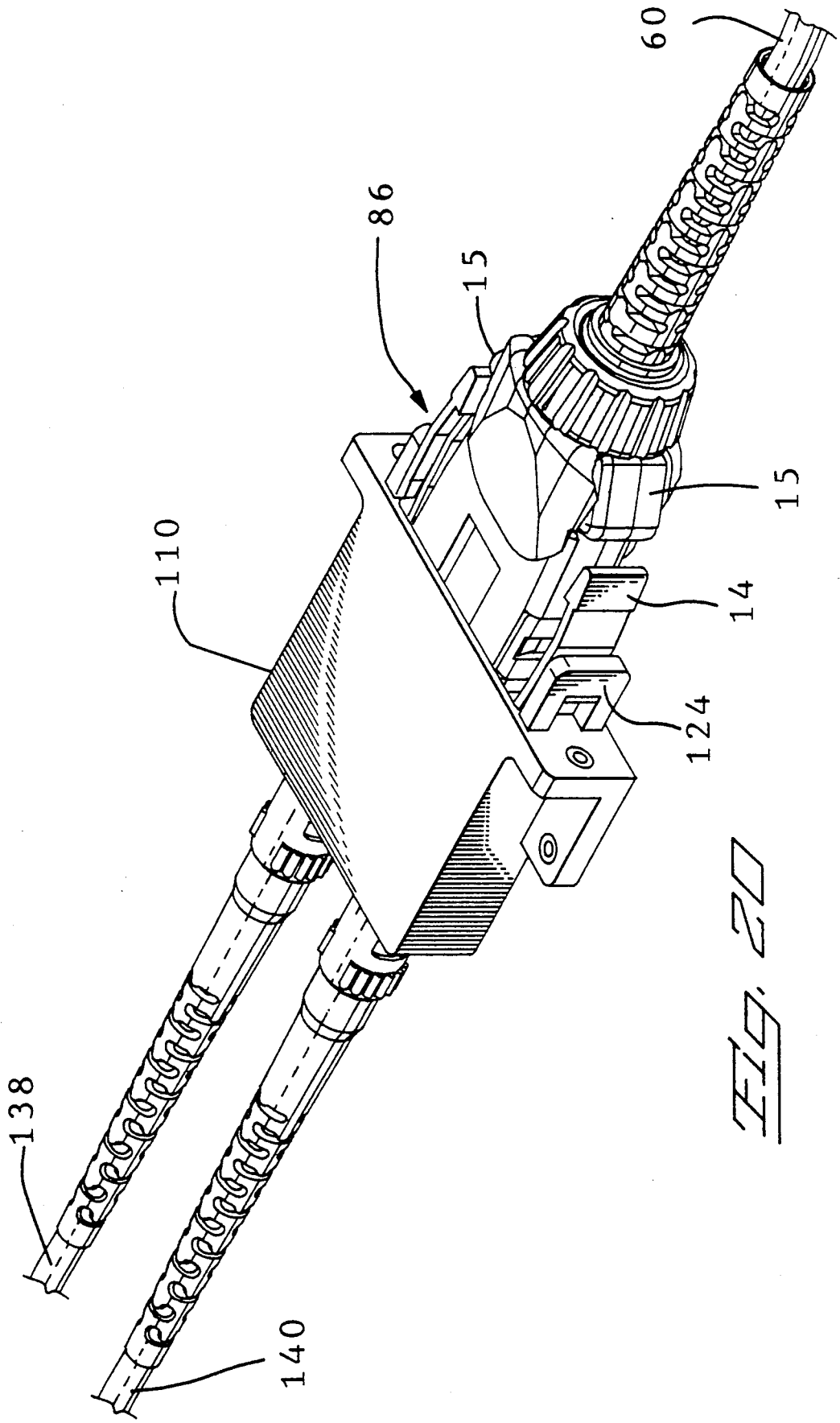

As shown in FIG. 20, once plug 86 is inserted fully within receptacle 110, integral latching arms 14, including latching lugs 16, engage with latching ears 124 of the receptacle, thereby retaining plug 86 within receptacle 110. Latching arms 14 are resilient, and may be pressed inwardly by finger pressure to release plug 86 from receptacle 110. Plug 86 may be grasped at surfaces 34 for pulling it from the receptacle. Integral projecting barriers 15 extend from exterior sides of the plug and bridge across spaces between the arms 14 and the exterior sides, and prevent a cable 60 from being inadvertently received between the arms 14 and the exterior sides. As shown, the barriers are not connected to ends of the arms. However, they may be joined to the arms, if desired.

The keying system of the present invention defines a plurality of keying configurations within contiguous keying portions comprising channel 20 of plug 86 and keying portion 132 of receptacle 110. The receptacle illustrated in FIG. 15, comprising a rib 134 of width D, mates only with a plug 86 having no keying element 96 associated therewith, whereby the entire channel 20 is open for axial ingress and egress of rib 134 when the plug is inserted into the receptacle. A receptacle having a narrow rib 136 positioned as illustrated in FIG. 16 will mate with a plug having no keying element 96 therein or with a plug having a keying element of the B configuration. A receptacle having a narrow rib 136 positioned as shown in FIG. 17 will mate with a plug having no keying element 96 or a keying element of the M configuration. Similarly, a receptacle having a narrow rib 136 positioned as shown in FIG. 18 will mate with a plug having no keying element 96 or a keying element of the A configuration.

Thus, a plug 86 having a keying element of the A, B or M configuration mates only with a receptacle having the corresponding A, B or M configuration. A plug having no keying element 96 associated therewith will mate with a receptacle having a rib 134 of width D as shown in FIG. 15, and with either of the rib configurations illustrated in FIGS. 16-18, comprising narrower ribs 136 in various locations within keying portion 132. A plug having no keying element is thus designated the "Slave" configuration inasmuch as it will mate with all configurations of a receptacle.

If plug and receptacle configurations, respectively, are mismatched, the plug will not be insertable into the receptacle. For example, if one attempts to insert a plug having a keying element of the A configuration into a receptacle of the B configuration, as shown in FIG. 16, the front surface 106 of keying element 94 will engage the forward end of rib 136 in the receptacle. This will prevent the plug from being inserted. Because keying element 94 is securely and rigidly positioned within plug 86, as previously described, the axially-directed forces acting between keying element 94 and rib 136 will not displace keying element 94 with respect to plug 86. Also, as noted above, receptacle 110 with rib 136, is rigid. Consequently, it is extremely difficult for the plug to be forceably inserted into the receptacle despite the mismatch.

Additionally, because the keying element 94 is adjacent front end 4 of plug 86, and because the rib within keying portion 132 of receptacle 110 extends to the front opening 118, a keying element mismatched with a receptacle configuration immediately contacts the rib upon attempted insertion of the plug. Thus, before any substantial portion of plug 86 is inserted into receptacle 110, the operator receives tactile feedback resulting from the abutting contact of keying element 94 with the rib, indicating that the plug and receptacle are mismatched. This is a clear signal to the operator that further insertion should not be attempted.

These qualities of the connector assembly according to the present invention represent a substantial improvement over many previously-known assemblies. In some previously-known keying systems, one connector, i.e., a plug, must be inserted a substantial distance within another connector, i.e., a receptacle, before the keying elements contact one another. As a result, such a connector assembly gives the appearance of a proper match until the respective parts are almost fully joined with each other. This may indicate to the operator that the components are properly matched when in fact they are not, tempting the operator to mistakenly force the components to mate with each other, potentially damaging the connectors and/or the associated system. The present invention overcomes these potential drawbacks by providing the above-described immediate tactile feedback to an operator upon a mismatch of a plug and receptacle, and by providing a structure in which it is virtually impossible to force fit a mismatched plug and receptacle.

FIG. 21 is a sectional bottom view of the mated plug 86 and receptacle 110 of FIG. 20, mounted on a panel 123. Some parts have been omitted for clarity.

As illustrated in FIG. 21, when plug 86 is inserted into receptacle 110, lug 16 of latching arm 14 engages latching ear 124 of the receptacle. Shroud portions 28 and 30 extend substantially fully into the receptacle. Ferrules 66 and 68 are aligned with and engage terminated optic fibers 142 and 144, respectively, positioned within cylindrical extensions 128. Optical signals may be transmitted between fibers 142, 144 and the terminated fibers within ferrules 66, 68, respectively. The invention is not limited to the configuration of the fiber mating interface illustrated in FIG. 21, but may include other known terminated optic fiber interface configurations suitable for incorporation into receptacle 110 and ferrules such as 66, 68.

Figure 22:
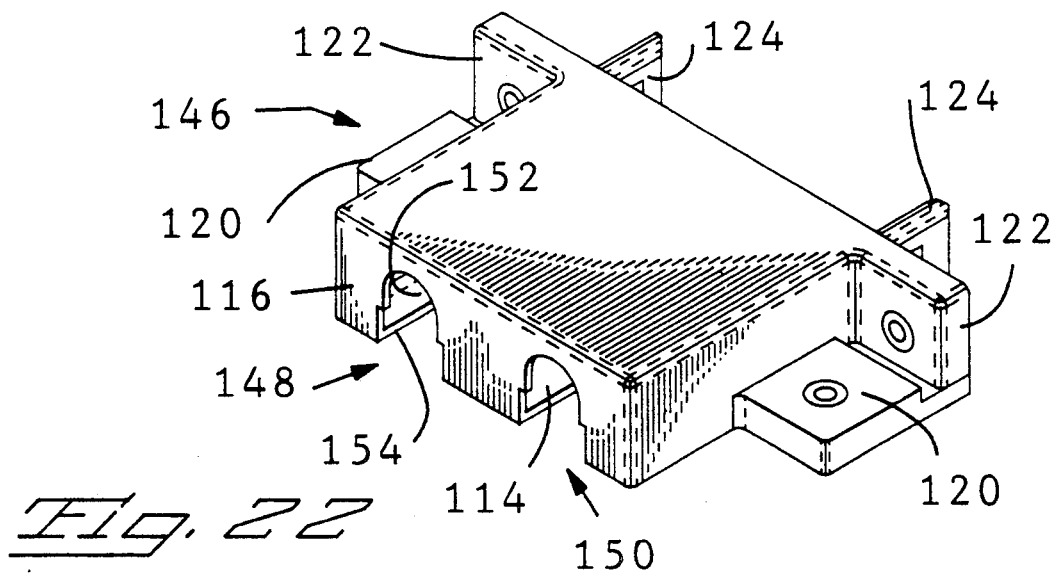
FIGS. 22-23 illustrate an alternate embodiment of a receptacle according to the present invention.
Figure 23:
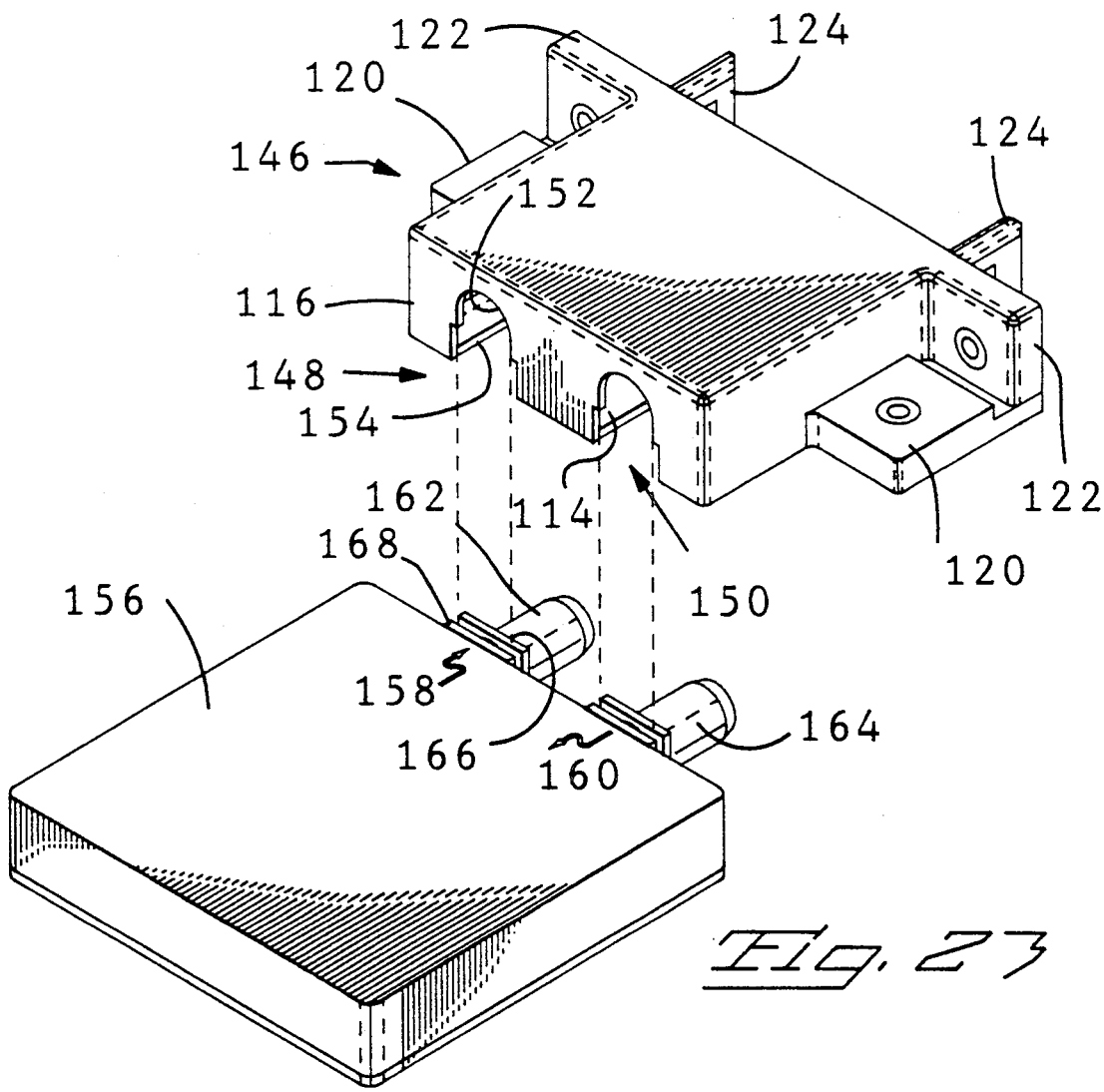

FIGS. 22-23 illustrate an alternate embodiment of a receptacle according to the present invention, designated generally by reference numeral 146. Receptacle 146 is similar in many respects to receptacle 110, described above, corresponding parts being designated by like reference numerals. Receptacle 146 includes a keying portion 132 having a rib 134 or 136, as previously described, but not illustrated in FIGS. 22-23.

Rear wall 116 and bottom wall 114 of receptacle 146 comprise a pair of openings 148 and 150. As shown in both FIGS. 22 and 23, each opening includes an arcuate portion 152 in wall 116 and a straight-walled portion extending from arcuate portion 152 to the base of wall 116 and into bottom wall 114.

Receptacle 146 is particularly adapted to be used in conjunction with a device 156 (FIG. 23) for emitting and/or receiving optical signals. In the exemplary embodiment, device 156 is a transceiver which both emits and receives optical signals, as indicated by the arrows 158 and 160 indicating the output and input functions of the output port 162 and the input port 164, respectively. The end portions of ports 162 and 164 may have a configuration suitable for mating with terminated optic fibers, as previously described with respect to FIG. 21.

The receptacle assembly of FIG. 23 is assembled by positioning receptacle 146 over ports 162 and 164 of device 156. Openings 154 in bottom wall 114 permit receptacle 146 to be inserted over ports 162, 164 in this manner. Arcuate portions 152 are seated over the exterior of ports 162 and 164 with portions of rear wall 116 being positioned between a pair of plates 166 and 168 associated with each of ports 162 and 164. Thus, plates 166, 168 secure and stabilize receptacle 146 with respect to device 156 and its ports 162, 164. Device 156 and receptacle 146 are typically both mounted on, i.e., a circuit board of a component or system, whereby their relationship to each other is secured. The ports 162, 164 extend inwardly of receptacle 146 and may be mated with terminated optic fibers associated with a plug in the manner previously described with reference to FIG. 21.

The receptacle embodiment illustrated in FIGS. 22-23 is particularly advantageous in connection with manufacturing and assembly of systems and subassemblies employing plug and/or receptacle types of connectors according to the present invention. Receptacle 146, in conjunction with plugs 86 as previously described, provide keying and polarization means according to the present invention. Receptacles of this configuration may be readily associated with pre-manufactured components, such as a transceiver 156, or some other optical component having an input and/or an output port adapted to be used as an input port and an output port spaced from each other at a standard distance, in the manner of ports 162, 164 of FIG. 23. A variety of components, such as 156, may be assembled on a printed circuit board or other panel with a receptacle 146. Such a receptacle eliminates the need to separately mount input and output ports, such as 162, 164 on a printed circuit board, which would require extraordinary assembly measures to assure that the ports are properly spaced from each other. This system thus permits standardization of parts, reduces manufacturing costs and increases manufacturing speed, all of which are highly advantageous.

FIGS. 24-29 illustrate an alternate embodiment of a receptacle according to the present invention which facilitates coupling to each other of two duplex plugs according to the invention.

Figure 24:
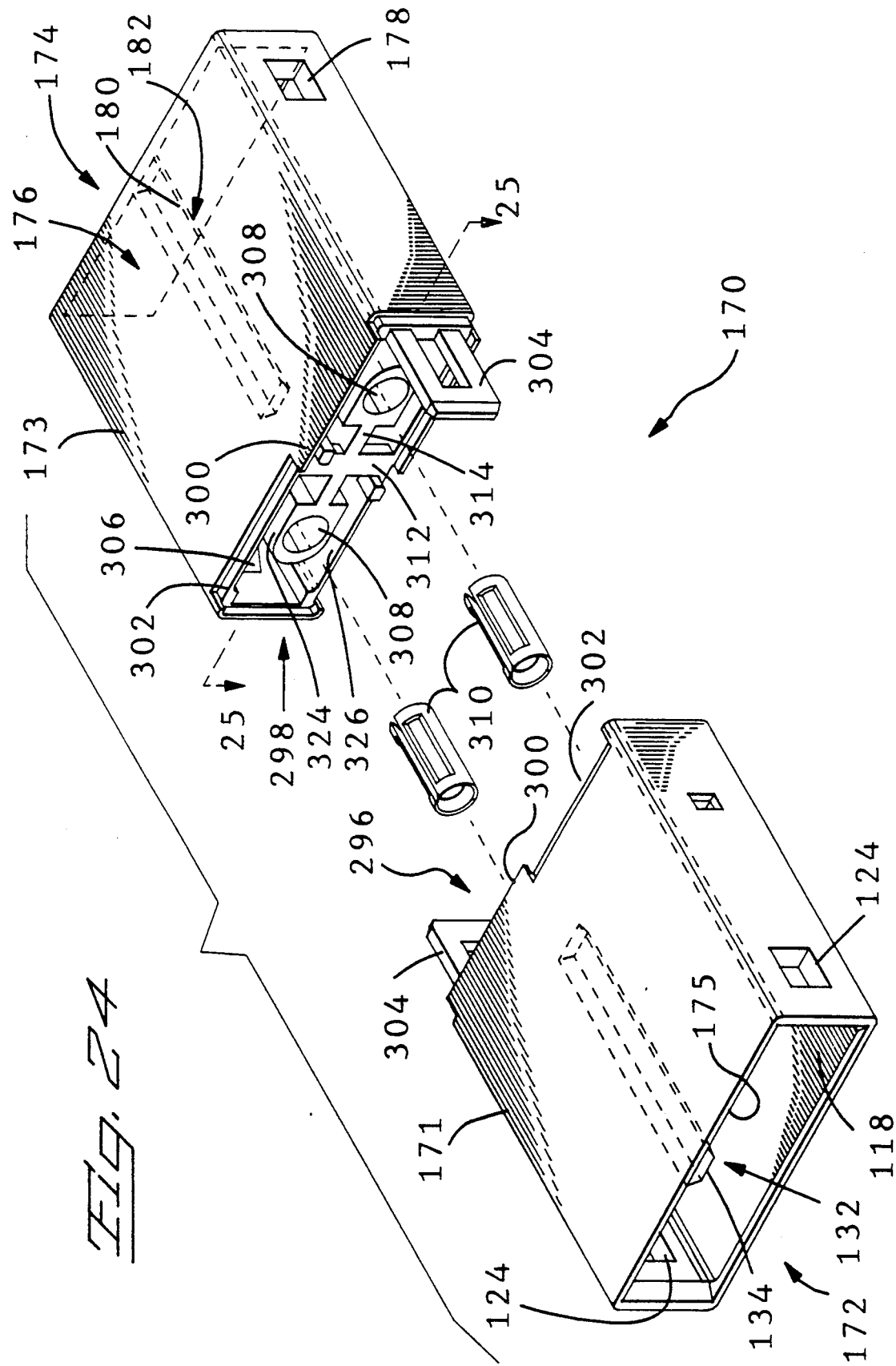
FIG. 24 is an exploded view of a duplex-to-duplex coupling assembly according to the present invention.

FIG. 24 is an exploded view of a receptacle allowing duplex-to-duplex coupling, designated generally by reference numeral 170. Receptacle 170 is of a generally tubular rectangular configuration and is comprised of a first half 171 and an identical second half 173. A first end 172 comprises a rectangular opening 118, a pair of integrally formed latching ears 124 and a rib, which is illustrated as 134 within keying portion 132 on the inside surface 175 of first half 171, in the manner previously described.

The other end 174 of receptacle 170 comprises a rectangular opening 176 similar to opening 118, a pair of latching ears 178 corresponding to ears 124 and a rib designated 180 within the keying portion 182 related to opening 176 on inside surface 175 of top portion 171.

First half 171 and second half 174 of assembly 170 comprise like-configured ends 296 and 298, respectively, adapted to be joined together as indicated by dashed lines in FIG. 24. Ends 296 and 298 each include extending flanges 300 and surface recesses 302. Each half 171, 174 includes, on one side thereof, a latch 304 and, on the other side thereof, a latching lug 306. Symmetrically disposed within second half 173 is a pair of support openings 308 adapted to receive and support a pair of alignment bushings 310. First half 171 comprises a like-pair of support openings 308. Support openings 308 and the manner in which they are positioned within the respective receptacle halves will be described in greater detail hereinafter, as will bushings 310.

When first and second halves, 171 and 173, are brought together, latches 304 engage with latching lugs 306 of the respectively opposite halves of the receptacle, maintaining the receptacle halves in engagement with each other. Flanges 300 are received within corresponding surface recesses 302. This overlap of flanges 300 with surface recesses 302 covers the seam at the interface of the receptacle halves.

The rib associated with opening 118 is shown as a rib 134 comprising the full width of its associated keying portion 132, as is rib 180 associated with opening 176. The receptacle 170 of FIG. 24 is by no means limited to this configuration, however. The ribs associated with openings 118 and 176, respectively can each be of any configuration previously described. This includes the full width ribs shown and the narrow ribs 136 located in respectively different positions within the keying portion.

The receptacle illustrated in FIG. 24 thus comprises essentially two receptacles end-to-end. Each of the receptacle openings 118, 176 may be provided with either of the four different keying elements 134, 136, 136, 136 of a single receptacle, as previously described. Each receptacle opening 118, 176 receives a corresponding plug 86 to connect two plugs 86, 86 together. Each plug 86 may have any of the plug keying elements or have no keying elements. Therefore, the receptacle illustrated in FIG. 24 may comprise up to 16 (four times four) different combinations for connecting together a pair of plugs 86, 86 according to the invention.

Figure 25:
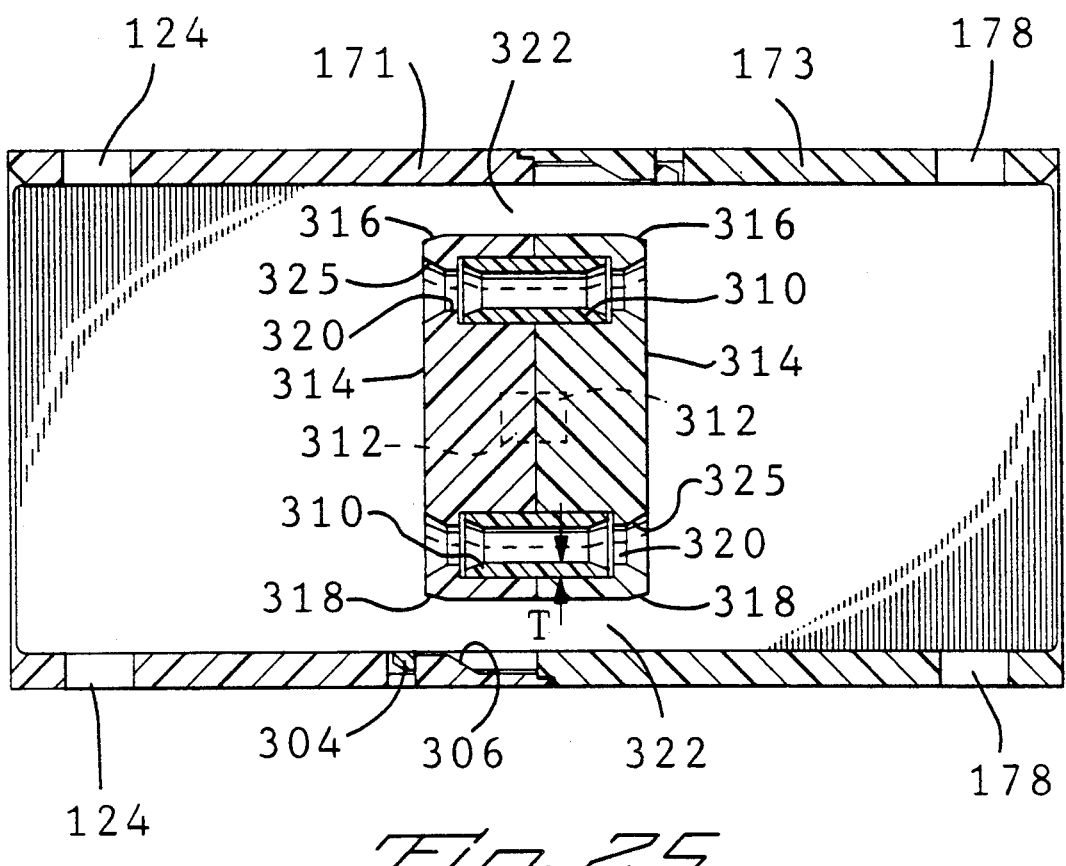
FIG. 25 is a plan view, in section, of the interior structure of the coupling assembly of FIG. 24.
Figure 26:
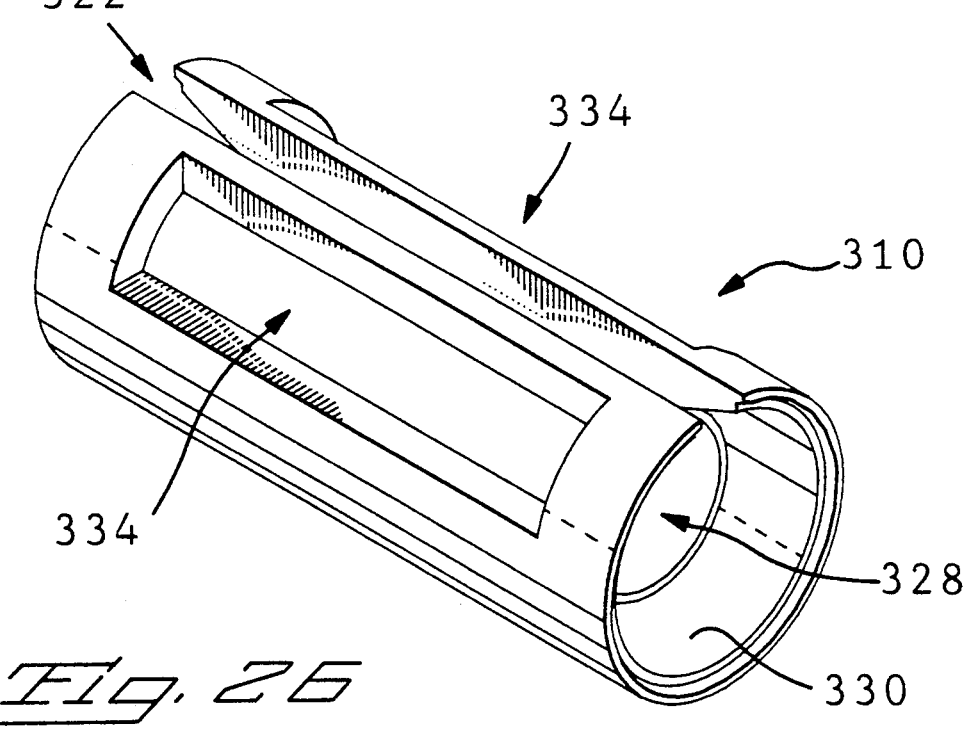
FIG. 26 is an enlarged view of a bushing comprising a portion of the structure shown in FIG. 24.

FIGS. 25 and 26, in conjunction with FIG. 24, illustrate the interior features and details of the receptacle 170 of FIG. 24. FIG. 25 is a sectional view of assembled receptacle 170 along line 25—25 of FIG. 24.

Figure 29:
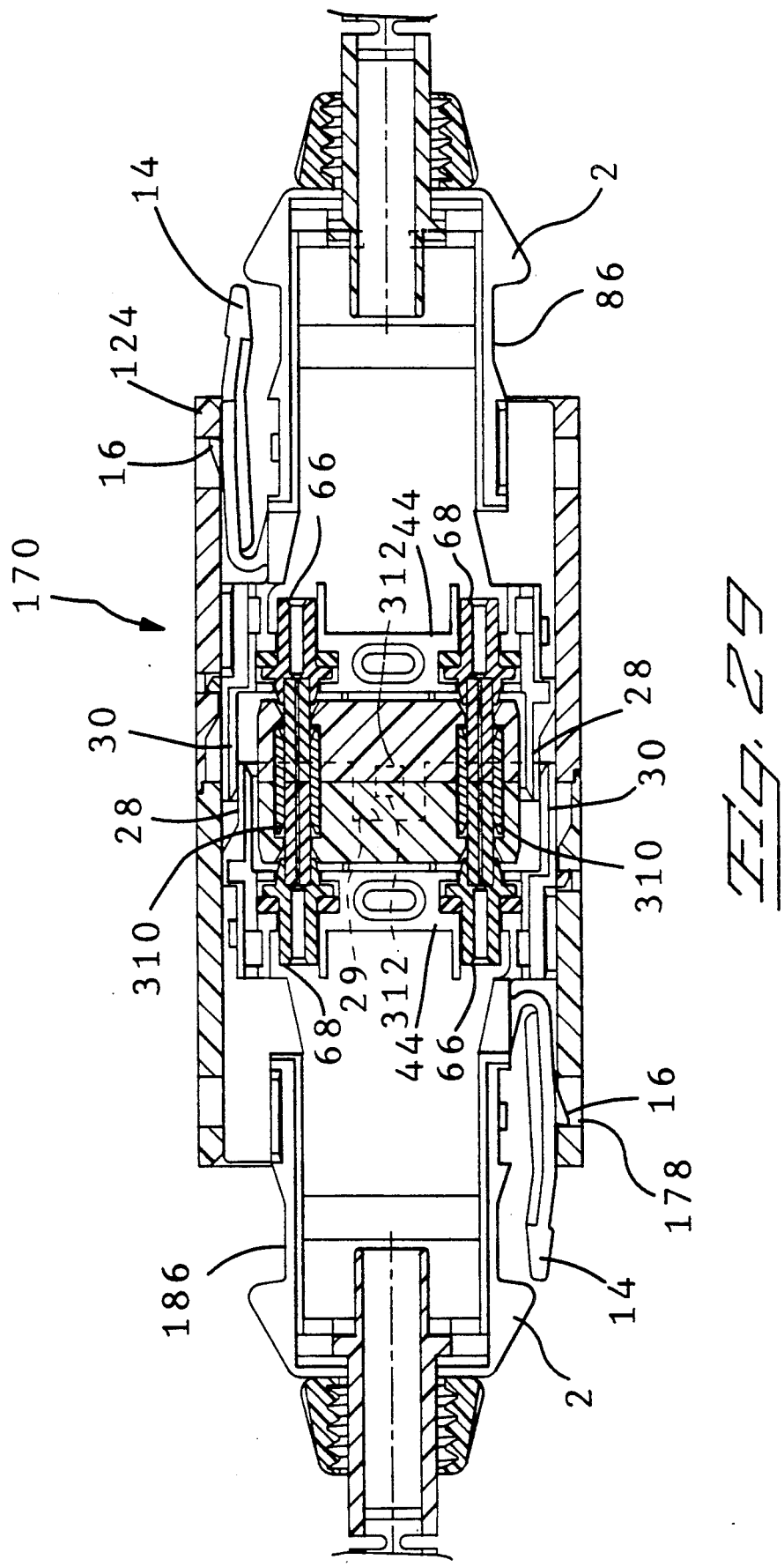
FIG. 29 is a sectional view of the joined plugs and coupling assembly of FIG. 28.

Receptacle half 173 comprises a support post 312 extending between the upper and lower interior surfaces thereof. A support web 314 extends to either side thereof and toward the opening 176 of receptacle half 173, as shown in FIGS. 24 and 25. Supported on opposite sides of web 314 are bushing support housings 316 and 318. Each housing 316 and 318 has therewithin a support opening 308, as previously described. As seen in FIG. 24, each support opening 308 is circular in cross section. At the end thereof facing end 174 of receptacle half 173 there is a circular aperture 320. Aperture 320 is of a diameter smaller than the overall diameter of support opening 308, thereby forming an annular, inwardly-projecting ridge 323 at the end of opening 308 nearest end 174 of receptacle half 173. Each aperture 320 includes a flared entry 325 which facilitates insertion into aperture 320 of a terminated optical fiber upon mating of a plug with receptacle assembly 170 (FIG. 29).

Alignment bushings 310 are inserted into support openings 308 prior to assembly of receptacle halves 171 and 173. Upon assembly of the receptacle halves, posts 312, 312, webs, 314, 314 and bushing support housings 316, 316 and 318, 318 are brought into face-to-face and abutting relationship, as illustrated in FIG. 25. Consequently, support openings 308 form a pair of cylindrical cavities, each supporting an alignment bushing 310 therein. Ridges 323 prevent bushings 310 from sliding out of cavities 308. FIG. 25 shows an alignment bushing 310 in each of the cylindrical cavities 308. As a result of the fact that the bushings support housings 316, 318 are suspended by posts 312 and webs 314, lateral clearances 322 are provided at opposite sides of support housings 316 and 318, as shown in FIG. 25, and upper and lower clearances 324 and 326, respectively, are provided above and below support housings 316 and 318, as shown in FIG. 24. Consequently, with the exception of the portion obstructed by posts 312, clearance is provided completely about alignment bushings 310 and associated support structure 314, 316, 318. This facilitates coupling of a pair of duplex plugs according to the invention, as will be described in greater detail below.

FIG. 26 is an enlarged, detailed view of alignment bushing 310, two of which are included in the receptacle 170 of FIG. 24.

Alignment bushing 310 is generally cylindrical in configuration and includes an axially-extending aperture 328. Each end of aperture 328 comprises a flared opening 330.

Bushing 310 is preferably molded or otherwise formed of thermoplastic material, having a cylindrical wall of thickness T, as shown in FIG. 25. Such thickness should be sufficient to make bushing 310 substantially rigid. However, an axially extending slit 332 is formed through the wall of bushing 310. On each side of slit 332, bushing 310 comprises a thin-walled portion 334. Slit 332 permits bushing 310 to expand slightly, despite the generally rigid structure of the bushing. Thin-walled portions 334 located adjacent slit 332 enhance the ability of bushing 310 to flex in the region of the slit.

As illustrated in FIGS. 24 and 25, a pair of bushings 310 are associated with receptacle 170, each bushing being supported within a cylindrical cavity 308. As shown in FIG. 25, the diameter of bushing 310 is slightly smaller than the diameter of cavity 308. This permits bushing 310 to expand to a limited degree when flexing outwardly in the manner described above.

Figure 27:
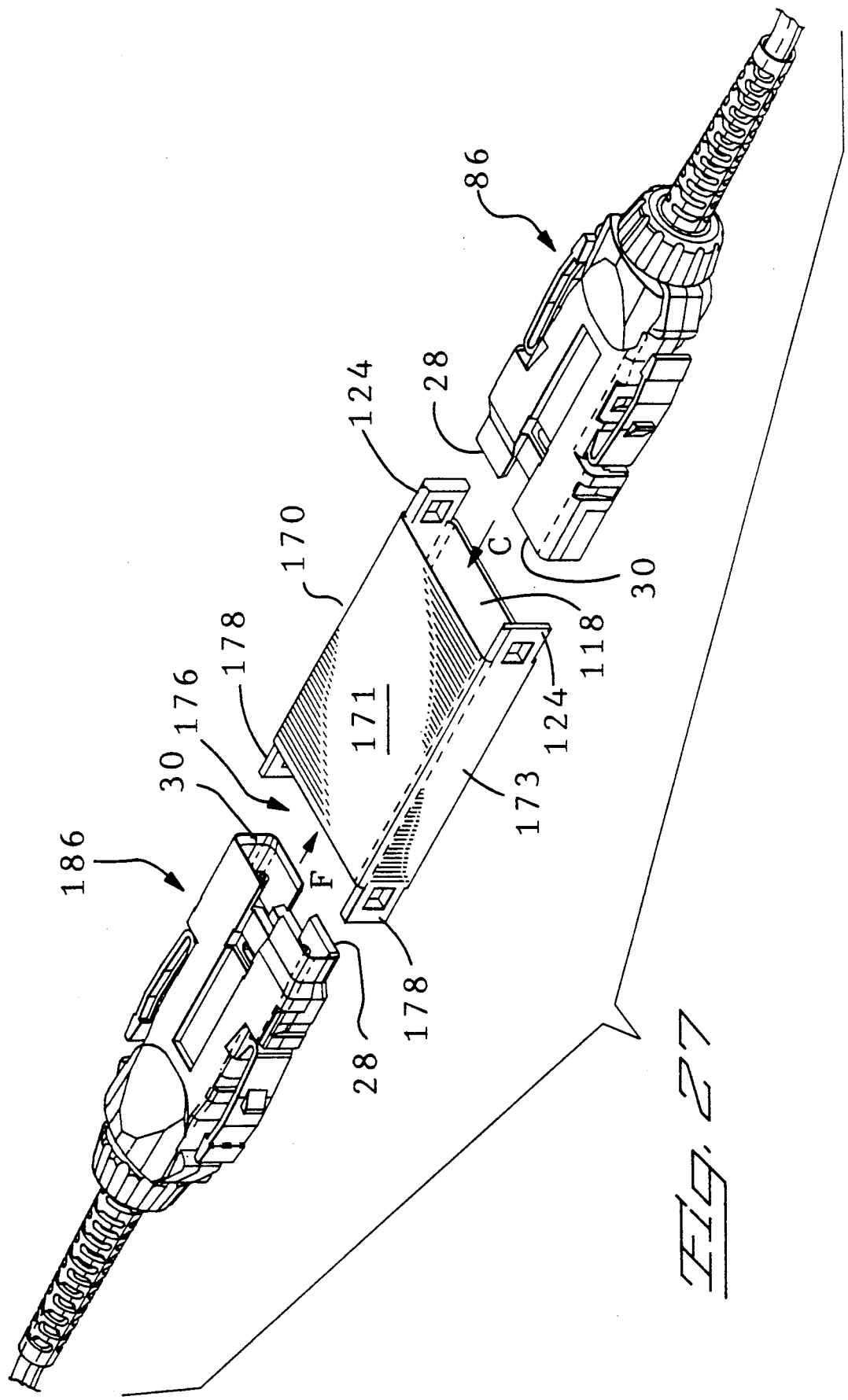
FIGS. 27-28 depict the manner in which a pair of duplex plugs are joined to each other by a coupling assembly as shown in FIG. 24.

FIG. 27 illustrates the manner in which receptacle 170 is utilized to mate a pair of duplex plugs according to the invention with each other. As illustrated in FIG. 27, assembly 170 may be utilized to mate a first plug 86 with a second, identical plug 186. Although plugs 86 and 186 are identical to each other, because of their relatively reversed positions with respect to each other, the male and female shroud portions 28 and 30 of plug 86 are aligned opposite the female and male shroud portions 30 and 28, respectively of plug 186. Assuming that the mating configuration of opening 118 by axial motion is compatible with the keyed configuration of plug 86, plug 86 may be inserted into opening 118 in the direction of arrow C, as shown in FIG. 27. Likewise, assuming that opening 176 and plug 186 are properly matched, plug 186 may be inserted into opening 176 in the direction of arrow F. Plug 86 is latched by engagement with ears 124, 124, as previously described. Likewise, plug 186 is latched with ears 178, 178, as illustrated in FIG. 28.

Figure 28:
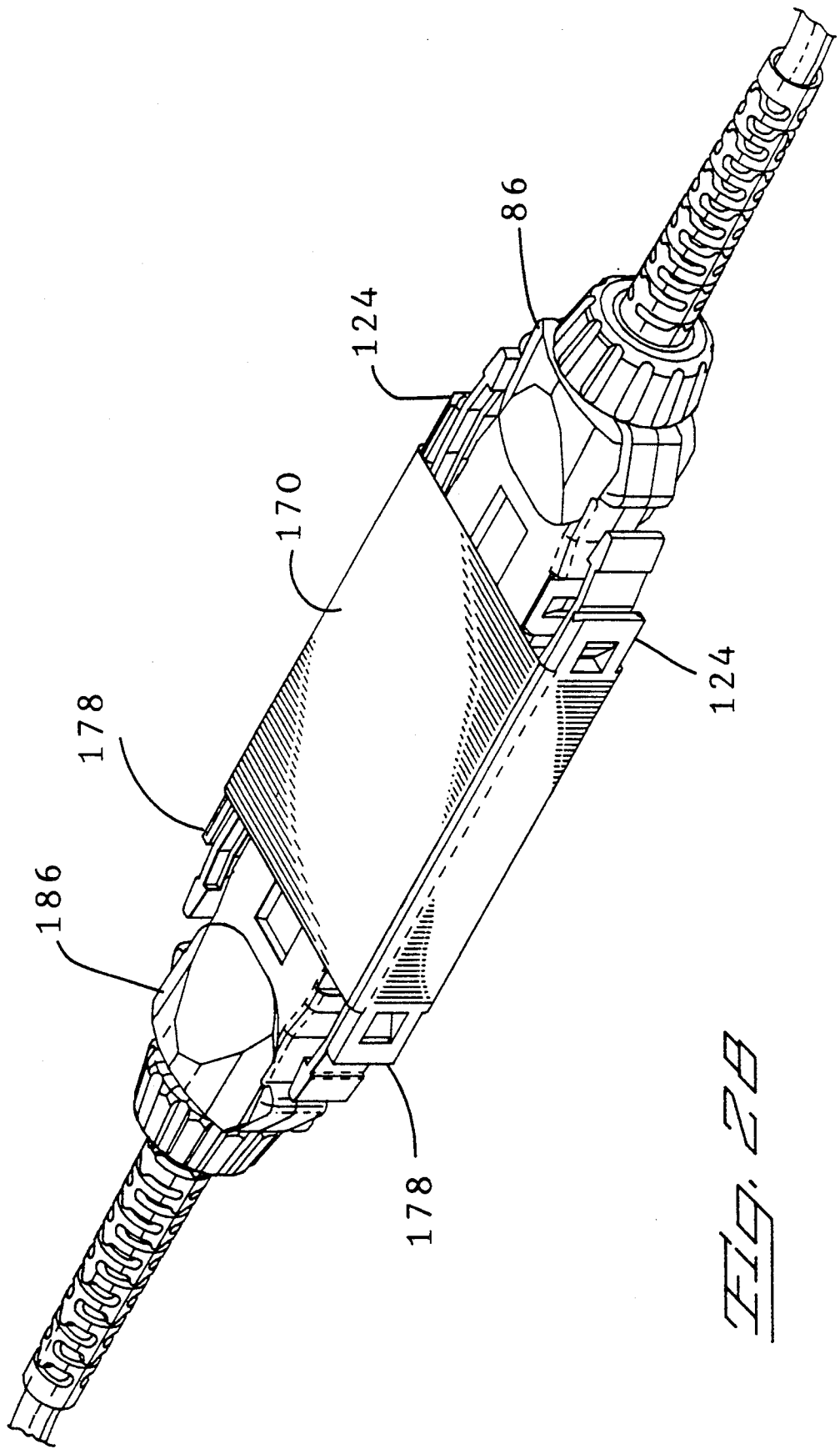

FIG. 29 is a bottom sectional view of the coupled duplex connectors of FIG. 28. Some parts have been omitted for clarity. As illustrated in FIG. 2 ferrules 66, 68 of plug 186 are inserted into alignment bushings 310, 310. Likewise, ferrules 68, 66 of plug 86 are inserted into the respective bushings. The flared entries 325 of apertures 320 and the flared openings 330 about the ends of axial aperture 328 facilitate insertion of the cylindrical nose portions 72 of the ferrules. As the ferrules are inserted into alignment bushings 310, the flexure permitted by slit 332 and thin-walled portions 334 allow the bushings to expand slightly, permitting insertion of the ferrules. The elastic forces tending to restore bushings 310 to a non-flexed state serve to confine and align the ferrules within the bushings. The clearance afforded bushings 310 within cavities 308 as a result of the fact that the cavities 308 have a diameter which is larger than the diameter of bushings 310, permits the aforesaid flexure and expansion of the bushings. The clearance also permits a limited degree of movement in all directions of bushings 310 within cavities 308, which facilitates movement of the bushings into positions aligned with the ferrules.

Thus, the ferrules and associated terminated optic fibers included in each of plugs 86 and 186 are brought into alignment with each other for transmission of optical signals therebetween.

As also shown in FIG. 29, the male and female shroud portions 28, 30, respectively, of plug 86 telescope with and become interengaged with the corresponding female and male shroud portions 30, 28, respectively, of plug 186. The shroud portions 28, 30 enter the clearance spaces 322, 324, and 326 surrounding bushings 310, 310 and supports 312, 314, 316, 318. The spaces or gaps 29 between the shroud portions of each plug provide clearance for accommodating posts 312 associated with both halves of assembly 170. The combination of male and female shroud configurations thus permits polarized, duplex-to-duplex mating of two connector plugs 86, 86 according to the invention. When the duplex connector plugs 86, 86 are unconnected, the shroud portions provide protection for the outwardly exposed terminated optic fiber ends at front end 4 of the plug.

The self-aligning bushings illustrated in FIG. 29 are not limited to use with duplex-to-duplex coupling, but can also be used in any receptacle such as shown in FIGS. 12-14. When used in this manner, rear wall 116 of the receptacle would be provided with means to support a pair of bushings therewithin for coupling to ferrules associated with a plug inserted into the receptacle and with optic fiber cables attached to the exterior of the receptacle. The cables attached to the exterior of the receptacle would likewise comprise a ferrule to conform to the interior configuration of the self-aligning bushing.

The present invention thus provides a keyed connector assembly which overcomes several disadvantages typically associated with previously-known connector systems. Connector assemblies according to the present invention are especially suited for use with duplex optic fiber cables.

What is claimed is:

1. A keyed connector assembly comprising:
   a receptacle having an opening; and
   a plug having an exterior shape corresponding to the shape of said opening and constructed for being axially insertable into said opening;
   said receptacle comprising, a receptacle keying portion consisting of a singular portion of an interior surface of said receptacle having a first width, and an inwardly projecting rib having a selected width within said first width for defining a receptacle mating configuration;
   said plug comprising, a plug keying portion consisting of a singular, axially extending channel and a corresponding width substantially the same as said first width in an exterior surface of said plug at a position corresponding to said receptacle keying portion when said plug is axially inserted in said opening, and a removable keying element in said channel and blocking said corresponding width of said channel, said keying element including a recess positioned toward one side of said channel for receiving said rib when said rib is sized to be received in said recess, and when said rib is positioned toward said one side of said channel to be received in said recess upon said plug being axially inserted in said opening.

2. A keyed connector assembly as in claim 1, wherein said keying element comprises means for selectively permitting a first portion of said channel to receive said rib of said receptacle keying portion and to selectively block second portions of said channel.

3. A keyed connector assembly as in claim 1, further comprising means for mounting a first pair of optical elements within said receptacle and means for mounting a second pair of optical elements within said plug, said receptacle keying portion and said plug keying portion defining the polarization of said respective pairs of optical elements when mated with each other by said connector assembly.

4. A keyed connector assembly as in claim 1, wherein said axially extending channel of said plug keying portion is recessed in a selected exterior surface of said plug and the exterior of said keying element is substantially flush with said selected exterior surface of said plug.

5. A keyed connector assembly as in claim 1, wherein said retaining portion of said keying element is inserted through said plug in a direction substantially perpendicular to the direction of insertion of said plug into said receptacle.

6. A keyed connector assembly as in claim 1, wherein said receptacle comprises said opening and a second opening opposite said first-named opening, said second opening also comprising a receptacle keying portion associated therewith,
   said assembly further comprising a second plug having an exterior shape corresponding to the shape of said second opening and axially insertable into said second opening of said receptacle, whereby said receptacle maintains said plug and said second plug in mated relationship with each other.

7. A keyed connector assembly as in claim 6, wherein said plugs have identical shrouds extending from the end portions of each plug axially insertable into said receptacle, wherein said respective shrouds are complementary to each other for facilitating mating of said plugs with each other.

8. A keyed connector assembly as in claim 7, wherein each plug comprises a male shroud portion and a female shroud portion disposed symmetrically on opposite sides of said end portion thereof.

9. A keyed connector assembly as in claim 8, wherein said male and female shroud portions of one of said plugs are mateable with said female and male portions, respectively, of the other of said plugs.

10. A keyed connector assembly as recited in claim 1, wherein, said keying element is mountable in either of two positions in said channel to position said recess either to said one side of said channel or to another side of said channel.

11. A keyed connector assembly comprising:

a receptacle having an opening; and a plug having an exterior shape corresponding to the shape of said opening and constructed for being axially insertable into said opening;

said receptacle comprising, a receptacle keying portion consisting of a singular portion of an interior surface of said receptacle having a first width, and an inwardly projecting rib having a selected width within said first width for defining a receptacle mating configuration;

said plug comprising, a plug keying portion consisting of a singular, axially extending channel of a corresponding width substantially the same as said first width in an exterior surface of said plug at a position corresponding to said receptacle keying portion when said plug is axially inserted in said opening, and a removable keying element in said channel and blocking said corresponding width of said channel for selectively defining a plug mating configuration, said selected width of said rib is less than said first width; and said keying element includes a key recess having a width less than said first width and positioned for receiving said rib when said plug is inserted axially into said opening.

12. A keyed connector assembly comprising:

a receptacle having an opening; and a plug having a exterior shape corresponding to the shape of said opening and constructed for being axially insertable into said opening;

said receptacle comprising, a receptacle keying portion consisting of a singular portion of an interior surface of said receptacle having a first width, and an inwardly projecting rib having a selected width within said firs width for defining a receptacle mating configuration;

said plug comprising, a plug keying portion consisting of a singular, axially extending channel of a corresponding width substantially the same as said first width in an exterior surface of said plug at a position corresponding to said receptacle keying portion when said plug is axially inserted in said opening, and a removable keying element in said channel and blocking said corresponding width of said channel for selectively defining a plug mating configuration, said keying element includes a retaining portion inserted through said plug and retained therein by friction.

13. A keyed connector assembly as in claim 12, further comprising means for facilitating removal of said keying element from said plug.

14. A keyed connector assembly as in claim 12, wherein a surface of said retaining portion of said keying element is exposed to the exterior of said plug, wherein force applied to said exposed surface of said retaining portion facilitates removal of keying element from said plug.

* * * * *